(12) United States Patent
Ishii et al.

(10) Patent No.: US 11,675,755 B2
(45) Date of Patent: Jun. 13, 2023

(54) INFORMATION MANAGEMENT DEVICE, INFORMATION MANAGEMENT METHOD, AND COMPUTER PROGRAM

(71) Applicant: KABUSHIKI KAISHA TOSHIBA, Tokyo (JP)

(72) Inventors: Gaku Ishii, Kawasaki (JP); Eiichi Sunagawa, Ota (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/186,759

(22) Filed: Feb. 26, 2021

(65) Prior Publication Data

US 2021/0182256 A1 Jun. 17, 2021

Related U.S. Application Data

(63) Continuation of application No. PCT/JP2020/008494, filed on Feb. 28, 2020.

(30) Foreign Application Priority Data

Sep. 17, 2019 (JP) .............................. JP2019-168696

(51) Int. Cl.
 *G06F 16/21* (2019.01)
 *G06F 16/215* (2019.01)
 *G06F 21/62* (2013.01)
 *G06Q 10/10* (2023.01)

(52) U.S. Cl.
 CPC ........ *G06F 16/215* (2019.01); *G06F 21/6218* (2013.01); *G06Q 10/10* (2013.01)

(58) Field of Classification Search
 CPC ... G06F 16/215; G06F 21/6218; G06Q 10/10; G06Q 10/08
 See application file for complete search history.

(56) References Cited

U.S. PATENT DOCUMENTS

| 2015/0324736 | A1 | 11/2015 | Sheets et al. |
| 2018/0300506 | A1 | 10/2018 | Kawakami et al. |
| 2019/0258230 | A1* | 8/2019 | Chiba ................. G05B 19/4183 |
| 2019/0362056 | A1* | 11/2019 | Shimakawa ........... G06F 21/105 |

FOREIGN PATENT DOCUMENTS

| JP | 5-73591 A | 3/1993 |
| JP | 2004-345753 A | 12/2004 |
| JP | 2007-102300 A | 4/2007 |
| JP | 2018-181039 A | 11/2018 |

OTHER PUBLICATIONS

International Search Report dated Apr. 14, 2020 in PCT/JP2020/008494 filed Feb. 28, 2020 (with English Translation of Categories of Cited Documents and Written Opinion), 9 pages.

* cited by examiner

*Primary Examiner* — Apu M Mofiz
*Assistant Examiner* — Cindy Nguyen
(74) *Attorney, Agent, or Firm* — Oblon, McClelland, Maier & Neustadt, L.L.P.

(57) ABSTRACT

According to one embodiment, an information management device includes an individual information manager configured to allocate a second identifier to a second individual obtained by performing a first operation on a first individual to which a first identifier is allocated; and a data generator configured to generate first data including the first identifier, the first operation, and the second identifier.

24 Claims, 15 Drawing Sheets

(A) MANAGEMENT ID, TRANSACTION DETAIL INFORMATION
(B) BELONGING ID, MANAGEMENT ID, TRANSACTION DETAIL INFORMATION
(C) BELONGING ID, MANAGEMENT ID, TRANSACTION DETAIL INFORMATION, INDIVIDUAL MANUFACTURING ID
(D) BELONGING ID, MANAGEMENT ID, TRANSACTION DETAIL INFORMATION, INDIVIDUAL CLASS ID, INDIVIDUAL MANUFACTURING ID

| EVENT COMPRESSION VALUE | MANAGEMENT ID (PRE-OPERATION MANAGEMENT ID) |
|---|---|
| ... | ... |
| ... | ... |
| ... | ... |

FIG. 5A

| EVENT COMPRESSION VALUE | BELONGING ID | MANAGEMENT ID (PRE-OPERATION MANAGEMENT ID) | INDIVIDUAL CLASS ID | INDIVIDUAL MANUFACTURING ID |
|---|---|---|---|---|
| ... | ... | ... | ... | ... |
| ... | ... | ... | ... | ... |
| ... | ... | ... | ... | ... |

FIG. 5B

CREATE (Create)
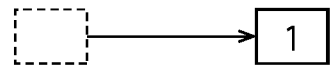
FIG. 6
UNITE (Unite)
(1) 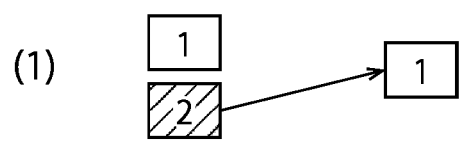
(2) 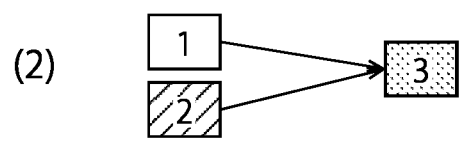
(3) 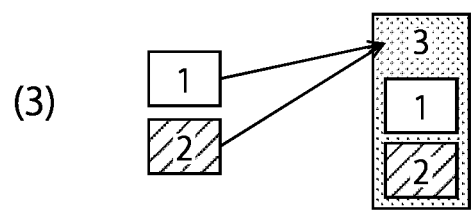
(4) 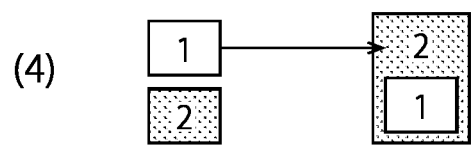
(5) 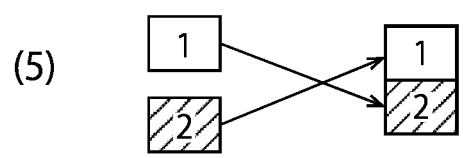
FIG. 7

DIVIDE (Divide)

CONVERT (Convert)

DELETE (Delete)

INDIVIDUAL IDENTIFICATION CHANGE HISTORY DATA

ITEM 1: TIME

ITEM 2: OPERATION TYPE

ITEM 3: (EVENT COMPRESSION VALUE OF INDIVIDUAL BEFORE OPERATION, PRE-OPERATION MANAGEMENT ID)
OPTION: BELONGING ID, INDIVIDUAL CLASS ID, AND INDIVIDUAL MANUFACTURING ID OF INDIVIDUAL BEFORE OPERATION

ITEM 4: POST-OPERATION MANAGEMENT ID
OPTION: BELONGING ID, INDIVIDUAL CLASS ID, AND INDIVIDUAL
ITEM 5: EVENT COMPRESSION VALUE OF INDIVIDUAL AFTER OPERATION
} TAG INFORMATION

FIG. 11

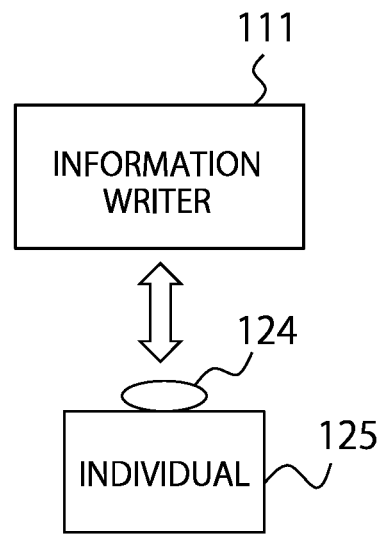

FIG. 12

INDIVIDUAL IDENTIFICATION CHANGE HISTORY DATA

ITEM 1: TIME

ITEM 2: OPERATION TYPE

ITEM 3: (EVENT COMPRESSION VALUE OF INDIVIDUAL BEFORE OPERATION, PRE-OPERATION MANAGEMENT ID)
OPTION: BELONGING ID, INDIVIDUAL CLASS ID, AND INDIVIDUAL MANUFACTURING ID OF INDIVIDUAL BEFORE OPERATION

ITEM 4: POST-OPERATION MANAGEMENT ID
OPTION: BELONGING ID, INDIVIDUAL CLASS ID, AND INDIVIDUAL
ITEM 5: EVENT COMPRESSION VALUE OF INDIVIDUAL AFTER OPERATION
} TAG INFORMATION

ITEM 6: DISCLOSURE FLAG (PERMISSION/PROHIBITION)

FIG. 21

INFORMATION MANAGEMENT DEVICE, INFORMATION MANAGEMENT METHOD, AND COMPUTER PROGRAM

CROSS REFERENCE TO RELATED APPLICATIONS

This application is a Continuation of International Application No. PCT/JP2020/008494, filed on Feb. 28, 2020, the entire contents of which is hereby incorporated by reference.

FIELD

Embodiments described herein relate to an information management device, an information management method, and a computer program.

BACKGROUND

In recurring business by DX (digital transformation)/ Digital Twin, it is required as a business foundation thereof to manage the life cycle of each individual such as a manufactured product or an application based on various kinds of data of the individual. The life cycle includes, for example, manufacturing, circulation (including logistics), operation, and discard processes. The individual receives an operation in accordance with a task in each process.

Typically, a common mapping table is prepared at a server to understand the life cycle indicating operations received by the individual in the respective processes. However, there are problems such as complication of a table structure and redundancy of mapping data.

BRIEF DESCRIPTION OF THE DRAWINGS

FIGS. 5A and 5B each is a diagram illustrating an exemplary reception information DB;

FIG. 6 is a diagram illustrating an exemplary create operation;

FIG. 7 is a diagram illustrating an exemplary unite operation;

FIG. 11 is a diagram illustrating exemplary individual identification change history data;

FIG. 12 is a diagram illustrating an example in which an information writer writes to an IC tag;

FIG. 21 is a diagram illustrating other exemplary individual identification change history data.

DETAILED DESCRIPTION

According to one embodiment, an information management device includes an individual information manager configured to allocate a second identifier to a second individual obtained by performing a first operation on a first individual to which a first identifier is allocated; and a data generator configured to generate first data including the first identifier, the first operation, and the second identifier.

Hereinafter, an embodiment of the present invention will be described with reference to the accompanying drawings.

Figure 1:
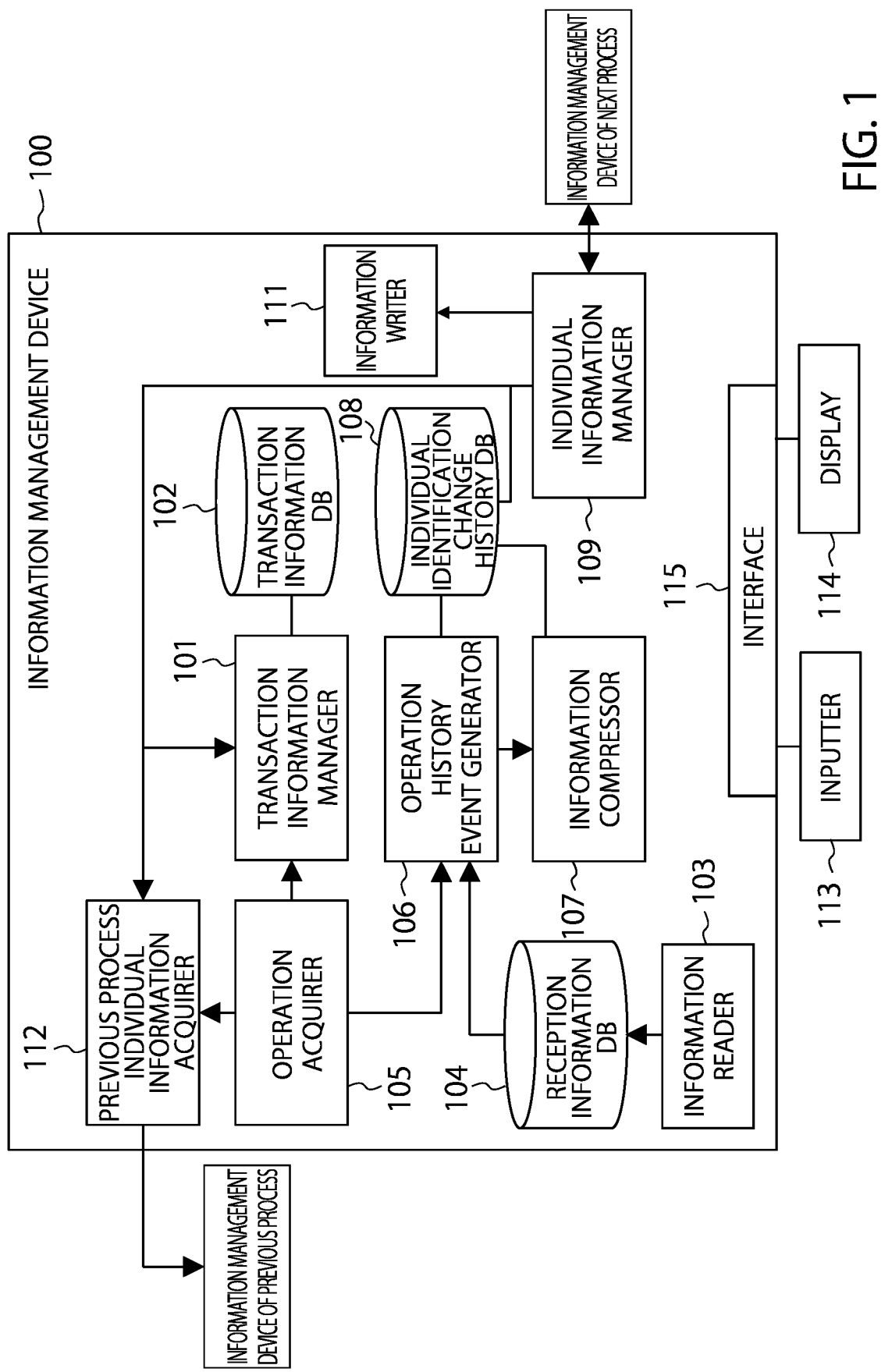
FIG. 1 is a block diagram of an information management device according to the present embodiment.

FIG. 1 is a block diagram of an information management device according to the present embodiment. This information management device 100 in FIG. 1 is arranged for a process (own-process) in the life cycle of an individual. Information management devices having configurations same as that in FIG. 1 are arranged for other processes. A plurality of processes are, for example, manufacturing, circulation (including logistics), operation, and discarding processes. However, the plurality of processes may be any other set of processes or may be determined at more minute granularity. The plurality of processes may be performed by an identical business entity or by different business entities. Some or all of the plurality of processes may be performed by the same business entity. One process may include a plurality of sub processes. In a process or a sub process, an operation in accordance with a task is at least once performed on an individual handled in the process or the sub process. Typically, an individual is an object handled in a task, such as a commercial product, a manufactured product, an item, or an application, for example. An object may be a tangible object or an intangible object. Examples of an object handled in a task include an electronic medium such as an electronic coupon as a promotion object. As described later in a modification, a subject that manages an object (for example, a space in which the object is disposed) may be regarded as an individual.

Figure 2:
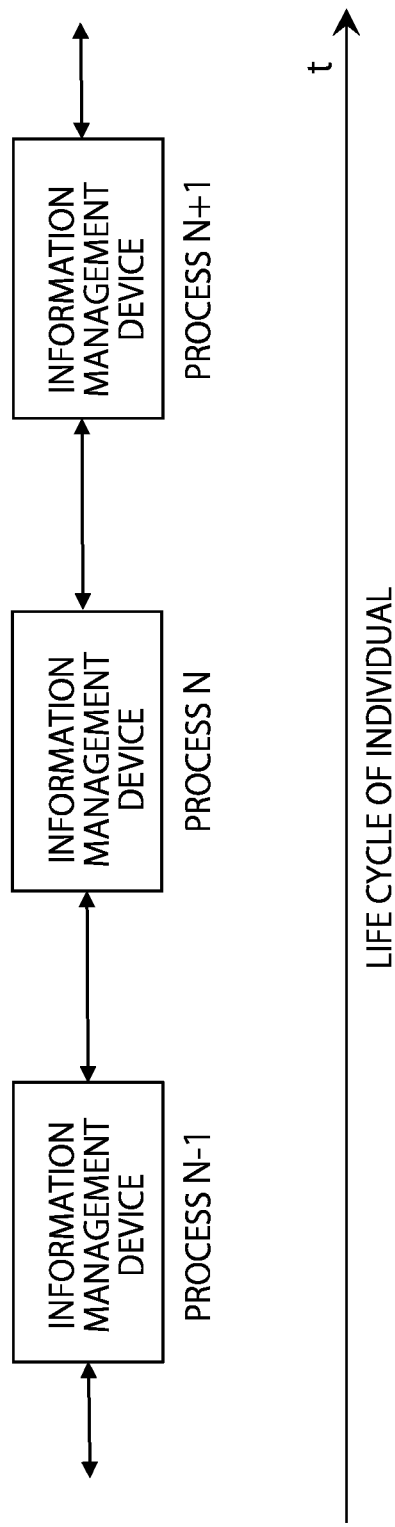
FIG. 2 is a diagram illustrating an exemplary information management system including a plurality of information management devices.

FIG. 2 illustrates an exemplary information management system including a plurality of information management devices arranged for a plurality of processes. The plurality of processes including Process N−1, Process N, and Process N+1 are arranged along a time axis. In the sheet, the left side is a higher-level side (upstream side), and the right side is a lower-level side (downstream side). Process N−1 is a process one level higher than Process N, and Process N+1 is a process one level lower than Process N. In this example, the processes are arranged in series, but a plurality of processes may be arranged in parallel at the lower-level of a process.

For example, a life cycle starts at Process 1, and the number of the process increases as the process proceeds. The information management devices of the respective processes are connected with each other through a communication network. The communication network may be a wired network, a wireless network, or a hybrid network of wired and wireless networks. The communication network may be a local area network or a wide area network such as the Internet. The information management devices of adjacent processes can perform data communication with each other between the processes.

The unit of management of an individual changes in accordance with an operation performed in each process. For example, a business entity of Process 1 is a lettuce producer. The producer produces lettuces and ships the produced lettuces in response to an order. In this case, the lettuces are initially managed in the unit of produced lettuce groups, and then, part of the lettuce group is managed in the new unit of lettuce groups for shipment to an orderer.

Assume that Process 2 is performed by a delivery business entity that purchases a lettuce group from the business entity of Process 1, divides the purchased lettuce group into groups for different business entities, and delivers the groups. In this case, the unit of purchased lettuce groups may be changed to the new unit of delivery destinations in which lettuce group are managed at the delivery business entity.

Assume that Process 3 is performed by a warehouser that purchases a lettuce group from the delivery business entity of Process 2 and temporarily stores the purchased lettuce group on a plurality of shelves. In this case, the warehouser may manage the lettuce group in the new unit of shelves on which lettuces are stored.

In this manner, the unit of management of an individual changes in accordance with a process. The present embodiment achieves easy understanding of how the unit of management of an individual changes, in other words, with which operation an individual is provided through a plurality of processes. For example, the present embodiment makes it possible to trace at which production entity an individual is harvested, to which delivery business entity the individual is shipped, and through which path the individual is delivered and stored on a shelf in a warehouse. Such traceability is achieved with a simple configuration.

The information management device 100 in FIG. 1 includes a transaction information manager 101, a transaction information database (DB) 102, an information reader 103, a reception information DB 104, an operation acquirer 105, an operation history event generator (data generator) 106, an information compressor (calculator) 107, an individual identification change history DB 108, an individual information manager 109, an information writer 111, a previous process individual information acquirer 112, an inputter 113, a display 114, and an interface 115. Each element can be implemented by a processor such as a CPU or circuitry.

The transaction information manager 101 acquires information on a transaction with a business entity of a process (next process or post-process) one level lower and stores the acquired transaction information in the transaction information DB 102. A business entity of the own-process performs, for example, a transaction in which an individual acquired by performing an operation in the own-process is delivered to a business operator of the next process. The transaction information includes a transaction management identifier (a management code or a management ID; hereinafter, referred to as a management ID) and detail information of the transaction. The management ID is an identifier that identifies the unit of management of an individual. In a task in the own-process, an individual as an output of the own-process is acquired by performing an operation on an individual received from a process (previous process) one level higher. Alternatively, an individual is acquired by newly operating (for example, produced or manufactured) the individual in the own-process.

An identical value of the management ID is allocated to individuals that are identical management targets (or belong to an identical management space). For example, an identical management ID is allocated to individuals of the same order. Examples of the management ID include order, manufacturing, and transfer order numbers (for example, a slip number) of an individual. The management ID may be an ID issued based on a certain rule, an ID determined at random, or an ID specified by a user. The detail information of a transaction includes, for example, the name and address of a transaction counterpart business entity, information (such as the commercial product name, the number, and the model number) of a transacted object, and the date and time of the transaction.

The transaction information may include, as a belonging code or a belonging ID (hereinafter, referred to as a belonging ID), an identifier that identifies a management system (for example, a transaction management system) of the management ID. The belonging ID is, for example, an identification number of the transaction management system. When the belonging ID is used, transactions having the same management ID but belonging to different management systems can be identified as separate transactions. The transaction information manager 101 and the transaction information DB 102 may have functions of the transaction management system.

In addition, the transaction information may include a manufacturing identification number (individual manufacturing ID) of a transacted individual. The individual manufacturing ID is an identifier that uniquely identifies the individual. In addition, the transaction information may include an ID (individual class ID) that identifies the kind of the transacted individual. Examples of the individual class ID include a JAN code or an EAN code.

At least one of the management ID, the belonging ID, the individual class ID, and the individual manufacturing ID is an exemplary identifier allocated to an individual.

Figures 3, 4:
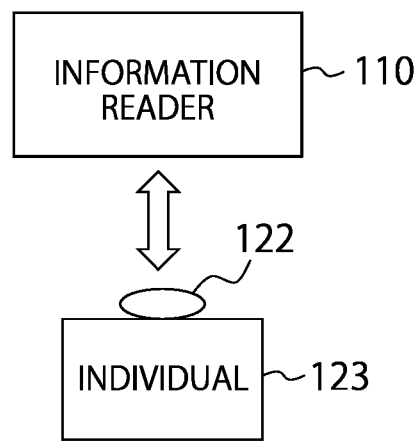
FIG. 3 is a diagram illustrating exemplary transaction information.
FIG. 4 is a diagram illustrating an example in which an information reader reads an IC tag.

FIG. 3 illustrates exemplary transaction information. The transaction information of (A) in FIG. 3 includes the management ID and the transaction detail information. The transaction information of (B) in FIG. 3 includes the belonging ID, the management ID, and the transaction detail information. The transaction information of (C) in FIG. 3 includes the belonging ID, the management ID, the transaction detail information, and the individual manufacturing ID. The transaction information of (D) in FIG. 3 includes the belonging ID, the management ID, the transaction detail information, the individual class ID, and the individual manufacturing ID.

Consider an example in which the own-process is performed by a delivery business entity, the next process is performed by a warehouser, and four of eight lettuces acquired from a production entity of the previous process is packed and delivered to the warehouser. In this case, in the own-process, the management ID can be set as the unit of management of the four lettuces to be delivered to the warehouser. The management ID is, for example, the number of a delivery slip used when the four lettuces are delivered. The management ID is associated with detail information such as the name and address of a transaction counterpart business entity and properties (such as the commercial product name, the number, and the model number) of a commercial product, and is stored in the transaction information DB 102.

The transaction information is produced and stored in the transaction information DB 102, for example, when a transaction with a business entity of the next process is performed. For example, in a case in which a transaction is performed by computer processing, the transaction information is generated when the transaction is performed. Alternatively, when the transaction information is input based on an input from a user working at the business entity of the own-process, the input transaction information is used. Registration of the information of a transaction with the business entity of the next process may be performed before lettuces are ordered to a business entity of the previous process. The user uses the inputter 113 to perform inputting. A screen for a transaction may be displayed on the display 114, and the user may input the transaction information through this screen.

The inputter 113 is a device through which the user inputs data or an instruction, and is, for example, a mouse, a keyboard, or a touch panel. The display 114 is a device configured to display data on a screen. The interface 115 is an interface for connecting the inputter 113 and the display 114 to the information management device 100.

The transaction information manager 101 may acquire information of a transaction with the business entity of the process (previous process) one level higher and store the acquired transaction information in the transaction information DB 102.

The information reader 103 reads, from a medium associated with an individual that is an operation target in the own-process and acquired from the previous process, notification information (tag information) related to the individual. The notification information includes, for example, the management ID related to the individual, and an event compression value to be described later. The notification information may include at least one of the belonging ID, the individual class ID, and the individual manufacturing ID in addition to the management ID and the event compression value. The management ID of the individual acquired from the previous process (individual before an operation) is also referred to as a pre-operation management ID.

The medium is, for example, an IC tag (also referred to as a radio frequency (RF) tag or a non-contact tag), a Quick Response (QR) code, a bar code, or an information recording medium such as a memory device (for example, a memory card). The IC tag or the memory device may be directly attached to the individual or a packing container of the individual. The QR code, the bar code, or the like may be printed on a sticker and bonded to the individual or the packing container or may be directly printed on the surface of the individual. The medium may be any other medium associated with the individual.

FIG. 4 is a diagram illustrating an example in which the information reader 103 performs reading from an IC tag. An IC tag 122 is attached to an individual 123. The individual 123 is conveyed, for example, on a belt conveyer, and the information reader 103 may sense the individual 123 and automatically perform the reading. Alternatively, when the information reader 103 has such a form that the information reader 103 can be grasped by the user, the user may hold the information reader 103 over the individual 123 to perform the reading. The information reader 103 reads tag information from the IC tag 122. The read tag information is stored in the reception information DB 104. After the reading by the information reader 103, the individual 123 is subjected to, for example, an operation in the own-process. However, the reading from the IC tag 122 may be performed after the operation in the own-process is performed.

(A) in FIG. 5 illustrates exemplary reception information DB 104. The management ID (pre-operation management ID) and the event compression value are stored therein. (B) in FIG. 5 illustrates other exemplary reception information DB 104. The event compression value, the management ID, the belonging ID, the individual class ID, and the individual manufacturing ID are stored therein.

The operation acquirer 105 acquires information indicating an operation performed on an individual as an operation target in the own-process (individual before the operation) or the type (operation type) of the operation. The following description is made on a case in which the type of the operation is acquired. The operation acquirer 105 corresponds to a first operation acquirer configured to acquire the operation or a second operation acquirer configured to acquire the type of the operation. The operation acquirer 105 determines, by using the individual information manager 109, a management ID for an individual obtained through the operation (individual after the operation). The management ID determined for the individual after the operation is also referred to as a post-operation management ID. Through an operation on an individual, the management ID of the individual changes from the pre-operation management ID to the post-operation management ID (the unit of management of the individual changes). The pre-operation management ID may be read from the medium associated with the individual at the operation or may be specified by a system that performs the operation or by the user in advance.

The own-process corresponds to, for example, a first process. A process one level higher than the own-process corresponds to, for example, a second process. A process one level lower than the own-process corresponds to, for example, a third process. An individual before an operation in the first process corresponds to a first individual, the operation performed on the first individual corresponds to a first operation, and the first individual after the operation corresponds to a second individual. An individual before an operation in the second process corresponds to a third individual, the operation performed on the third individual corresponds to a second operation, and the second individual after the operation corresponds to the first individual. An individual before an operation in the third process corresponds to the second individual. An identifier allocated to the first individual corresponds to a first identifier, and an identifier allocated to the second individual corresponds to a second identifier. An identifier allocated to the third individual corresponds to a third identifier.

The operation acquirer 105 transfers, to the individual information manager 109, a request for issuing a management ID. The individual information manager 109 determines a management ID based on the issue request. The individual information manager 109 provides the generated management ID to the operation acquirer 105. The management ID is used as a management ID for a transaction of the corresponding individual with the next process. When a transaction with the next process is arranged and a management ID is determined, the individual information manager 109 may read the management ID from the transaction information DB 102 through the transaction information manager 101 and provide the read management ID to the operation acquirer 105. Alternatively, when no transaction is arranged or when no management ID is determined, the individual information manager 109 may generate a management ID. For example, a management ID may be issued based on a predetermined rule or may be determined at random. The determined management ID is used as the management ID of a transaction with the business entity of the next process (for example, as a slip number). It is possible to understood which management ID is used for a transaction of which individual based on the correspondence relation between the pre-operation management ID and the post-operation management ID in the individual identification change history DB 108 to be described later.

The operation acquirer 105 may acquire, based on, for example, an input from the user, the type of an operation performed on an individual. In this case, the user inputs, by using the inputter 113, information that specifies the type of the operation. Alternatively, the operation acquirer 105 may acquire a predetermined type when the contents of the operation are determined in advance. Alternatively, the contents of the operation or execution of the predetermined operation may be sensed by a sensor, and the type of the operation may be acquired in accordance with the sensed information. In this case, the operation acquirer 105 is electrically connected with the sensor and detects the type of the operation in accordance with a detection signal from the sensor.

The following describes the type of an operation. The type of an operation is roughly divided into "create", "unite", "divide", "convert", and "delete". The kinds of the unite and divide operations are more finely divided. However, the present invention is not limited to these types, and other types may be defined.

[Create]

The create operation is new creation (for example, production or manufacturing) of an individual. In other words, the create operation is new setting of, as a management target, an individual to which no management ID is allocated.

FIG. 6 is a diagram illustrating an exemplary create operation. An individual is newly created (for example, produced or manufactured) for the individual. A rectangle in the drawing schematically represents an individual, and a number in the rectangle is a value that schematically identifies the individual (this applies in the following description as well).

[Unite]

The unite operation is an operation to unite a plurality of individuals into one individual.

FIG. 7 is a diagram illustrating an exemplary unite operation. The unite operation has a plurality of kinds. The drawing illustrates five examples.

Example (1) in FIG. 7 is an operation to unite a plurality of individuals of the same kind into one individual. The operation of (1) in FIG. 7 is referred to as "Unite Operation (1)". Specifically, a case in which a plurality of lettuces are collectively managed as one corresponds to the present case. The lettuces before unity may be provided with different management IDs due to difference in shipment factory, producer, shipment date, or the like or may be provided with the same management ID.

Example (2) in FIG. 7 is an operation to synthesize individuals of a plurality of different kinds into one new individual. The operation of (2) in FIG. 7 is referred to as "Unite Operation (2)". In the individual after the synthesis, the individuals before the synthesis are not individually recognized. Typically, different management IDs are allocated to the individuals before the synthesis. The present example corresponds to, for example, a case in which a plurality of individuals are synthesized to create a new individual (synthesis object). A specific example is a case in which two components are synthesized to generate a metal.

Example (3) in FIG. 7 is an operation to put individuals of a plurality of different kinds into another individual to create one new individual. The operation of (3) in FIG. 7 is referred to as "Unite Operation (3)". In the new individual, recognition of the original individuals is maintained. As a specific example, a case in which a plurality of lettuces are packed into one box corresponds to the present case.

Example (4) in FIG. 7 is an operation to set an individual as an element (part) of another individual. The operation of (4) in FIG. 7 is referred to as "Unite Operation (4)". In the individual after the unity, recognition of the individual before the unity is maintained. For example, setting of an individual as an appendage of another individual or a case in which an individual is set as part of another individual corresponds to the present case. As a specific example, a case in which a commercial product is put into a shopping basket in a shop corresponds to the present case.

The following describes difference between Unite Operation (3) and Unite Operation (4). Unite Operation (3) assumes a case in which an individual (such as a cardboard box) in which another individual is placed is excluded as a management target (for example, discarded) after the other individual is taken out in a later process. However, Unite Operation (4) assumes a case in which management of the individual is continued after the other individual (such as a shopping basket) is taken out.

Example (5) in FIG. 7 is an operation to connect different individuals. The operation of (5) in FIG. 7 is referred to as "Unite Operation (5)". For example, a case in which an individual is bonded or fitted to another individual corresponds to the present case. For example, a case in which a bolt is screwed into a nut to have a bolt-screwed nut corresponds to the present case.

[Divide]

The divide operation is an operation to divide one individual into a plurality of individuals.

Figure 8:
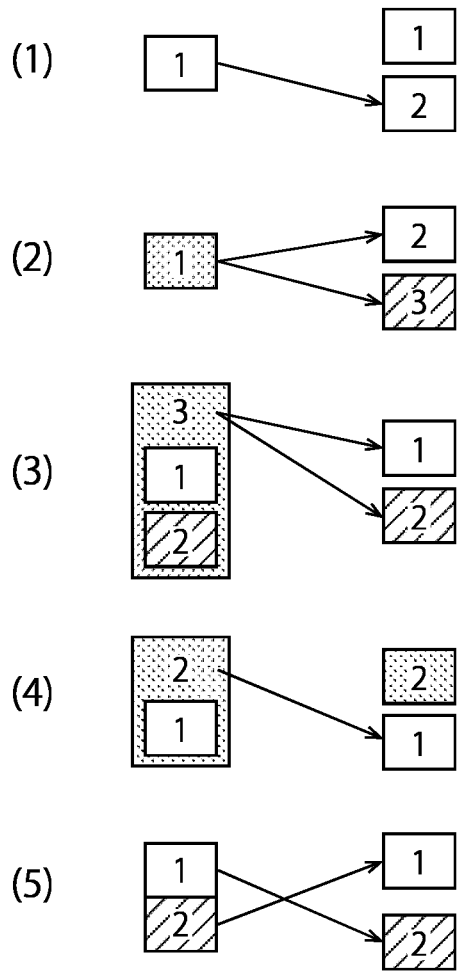
FIG. 8 is a diagram illustrating an exemplary divide operation.

FIG. 8 is a diagram illustrating an exemplary divide operation. The divide operation has a plurality of kinds. The drawing illustrates an example of five kinds.

Example (1) in FIG. 8 is an operation to divide an individual into a plurality of individuals. The operation of (1) in FIG. 8 is referred to as "Divide Operation (1)". A case in which part of an individual is separated to create a new individual of the same kind corresponds to the present case. For example, some of a plurality of lettuces are taken out and the rest is left intact. For example, the management ID of each separated individual is newly generated, and the management ID of any other individual is same as the management ID of the original individual.

Example (2) in FIG. 8 is an operation to disassemble an individual into a plurality of individuals. The operation of (2) in FIG. 8 is referred to as "Divide Operation (2)". The divide operation (2) corresponds to the unite operation of (2) in FIG. 7. The individual before the disassembly becomes unable to be recognized through division. For example, a case in which an individual is disassembled into a plurality of new elements corresponds to the present case. A specific example is a case in which a metal is disassembled into two components.

Example (3) in FIG. 8 is an operation to take, out of an individual, one or a plurality of individuals included in the individual. The operation of (3) in FIG. 8 is referred to as "Divide Operation (3)". The divide operation (3) corresponds to Unite Operation (3). The original individual is excluded as a management target. For example, a case in which a plurality of elements included in an individual are taken out as a plurality of individuals corresponds to the present case. A specific example is a case in which a plurality of lettuces are taken out of a packing container transferred from a factory. The packing container is, for example, discarded and excluded as a management target.

Example (4) in FIG. 8 is an operation to take, out of an individual, an element included in the individual, and maintain the original individual as a management target. The operation of (4) in FIG. 8 is referred to as "Divide Operation (4)". The divide operation (4) corresponds to Unite Operation (4). For example, a case in which an element included in an individual is taken out as an individual to cancel unity with the original individual corresponds to the present case. A specific example is a case in which a commercial product is taken out of a shopping basket in a shop. For example, the same management ID as a management target is maintained for shopping after the commercial product is taken out.

Example (5) in FIG. 8 is an operation to separate a plurality of connected individuals. The operation of (5) in FIG. 8 is referred to as "Divide Operation (5)". The divide operation (5) corresponds to Unite Operation (5). For example, a case in which individuals bonded or fitted to each other are separated from each other corresponds to the present case. A specific example is a case in which a bolt is removed from a bolt-screwed nut to achieve separation into a bolt and a nut. The bolt and the nut after the separation may be newly provided with management IDs.

[Convert]

The convert operation is an operation to convert an individual into another individual.

Figure 9:
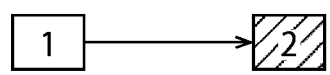
FIG. 9 is a diagram illustrating an exemplary convert operation.

FIG. 9 is a diagram illustrating an exemplary convert operation. The convert operation is an operation to convert an individual into another individual. For example, a case in which an individual is reformed into another individual corresponds to the present case. A specific example is a case in which a furniture assembly kit is assembled into furniture, a case in which an object is subjected to thermal treatment, or a case in which an object is colored.

[Delete]

The delete operation is an operation to exclude an individual as a management target by, for example, discarding the individual.

Figure 10:
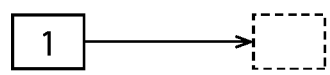
FIG. 10 is a diagram illustrating an exemplary delete operation.

FIG. 10 is a diagram illustrating an exemplary delete operation. The example in FIG. 10 is an operation to exclude an individual as a management target by discarding the individual. A dashed-line rectangle schematically represents the discarded individual. The management ID of the individual excluded as a management target may be a null value, or a special value may be defined and used as the management ID.

The operation acquirer 105 provides, to the operation history event generator 106, the time of an operation, the management ID (pre-operation management ID) of an operation target individual, the type of an acquired operation, and the management ID (post-operation management ID) of an individual after the operation. The operation acquirer 105 may include a clock configured to count time or may read, from a clock mounted on the information management device 100, a time at which an operation is acquired.

The operation history event generator 106 acquires the event compression value corresponding to the pre-operation management ID (the event compression value of the individual before the operation) from the reception information DB 104. The operation history event generator 106 generates an operation history event based on the event compression value, the time of the operation, the type of the operation, the pre-operation management ID, and the post-operation management ID.

The operation history event includes, for example, items below.

Item 1: the time of the operation
Item 2: the type of the operation
Item 3: a pair of the event compression value of the individual before the operation and the pre-operation management ID
Item 4: a post-operation management ID The time of the operation in Item 1 is a time at which the type of the operation is acquired by the operation acquirer 105. However, a time at which the operation history event is generated may be used as the time of the operation, or any other alternative time may be used as the time of the operation.

The type of the operation in Item 2 is the type of the operation acquired by the operation acquirer 105.

Item 3 may further include at least one of the belonging ID, the individual class ID, and the individual manufacturing ID of the individual before the operation. In other words, at least one of the belonging ID, the individual class ID, and the individual manufacturing ID of the individual before the operation may be further included as an option. When there are a plurality of operation target individuals and the values of Items 1, 2, and 4 are same for the plurality of individuals, Item 3 may include pairs of the event compression value and the pre-operation management ID in a number equal to the number of the plurality of individuals.

Item 4 may further include at least one of the belonging ID, the individual class ID, and the individual manufacturing ID of the individual after the operation. In other words, at least one of the belonging ID, the individual class ID, and the individual manufacturing ID of the individual after the operation may be further included as an option.

The operation history event generator 106 corresponds to, for example, a data generator. The operation history event corresponds to, for example, first data or third data. However, the first data or the third data may not include the event compression value of the individual before the operation in Item 3 and the time of the operation in Item 1. The event compression value of the individual before the operation is associated with data (the first data or the third data) including at least the type of the operation, the pre-operation management ID, and the post-operation management ID.

The information compressor 107 calculates the event compression value by compressing data of the operation history event generated by the operation history event generator 106. Specifically, for example, data obtained by connecting strings in the items of the operation history event is compressed. The compression is, for example, processing of anonymizing provided information to an optional fixed length. A specific exemplary method of the compression is a hash function. The event compression value functions as a key for searching for the operation history event corresponding to the event compression value. The event compression value may be referred to as a key value.

Some items may be excluded when data of the operation history event is compressed. For example, when the individual manufacturing ID is included in Item 4, the individual manufacturing ID may be excluded. Accordingly, as described later, identification of whether individuals of different individual manufacturing IDs have been provided with the same operation can be easily performed only by determining whether the event compression value is same therebetween. Further, Item 3 does not exist when no process exists before the own-process. In this case, Item 3 may be excluded.

The event compression value is an exemplary first value based on the operation history event (first data or third data). The information compressor 107 corresponds to a calculator configured to calculate the first value or a third value based on the operation history event. The event compression value or key value calculated by the information compressor of an information management device of a process one level higher is an exemplary second value based on the operation history event (second data). The first to third data may not include the event compression value of the individual before the operation in Item 3 and the time of the operation in Item 1.

The operation history event generator 106 associates the event compression value with the operation history event to generate individual identification change history data. The individual identification change history data is stored in the individual identification change history DB 108.

FIG. 11 illustrates exemplary individual identification change history data. The set of Items 1 to 4 are same as that of the operation history event described above. The event compression value in Item 5 is added to the operation history event. The pair of Items 4 and 5 correspond to, for example, the notification information (tag information). The individual identification change history DB 108 is a key database that achieves conjunction of the operation history events in information management devices arranged for respective processes in the life cycle.

The individual information manager 109 generates the notification information (tag information) including the post-operation management ID (Item 4 in FIG. 11) and the event compression value of the operation history event (Item 5 in FIG. 11). The individual information manager 109 writes the generated tag information to the medium for the individual after the operation through the information writer 111. When Item 4 includes, as an option, at least one of the belonging ID, the individual class ID, and the individual manufacturing ID, the tag information further includes at least one of the belonging ID, the individual class ID, and the individual manufacturing ID.

The information writer 111 writes the tag information to a medium in accordance with instruction data or an instruction signal from the individual information manager 109. The medium may be an IC tag, a memory device (memory card), a QR code, or a bar code as described above. The QR code, the bar code, or the like may be written on a slip bonded to the individual or a package. The medium may be attached to the individual at the timing of the writing or the medium may be attached to the individual after the writing ends. When an IC tag or the like is attached to the individual acquired from the previous process, the tag information of the individual of the previous process may be deleted from the IC tag or the like, and the tag information may be newly written. Alternatively, the IC tag may be removed, and an IC tag may be newly attached. When a QR code sticker or the like is attached to the individual acquired from the previous process, a sticker such as a QR code may be newly bonded over the sticker.

FIG. 12 illustrates an example in which the information writer 111 performs writing to an IC tag. An IC tag 124 is attached to an individual 125. The individual is conveyed, for example, on a belt conveyer and the information writer 111 performs writing to the IC tag 124 of the individual. When the information writer 111 has such a form that the information writer 111 can be grasped by the user, the user may write information by holding the information writer 111 over the IC tag 124. In this manner, the individual information manager 109 writes the tag information to the IC tag 124 by using the information writer 111. Thereafter, the individual 125 is transferred to the next process by, for example, a delivery business entity.

The display 114 may display, for example, the contents of the individual identification change history DB 108.

The individual information manager 109 analyzes, based on an instruction from the user, change of the unit of management of an individual in the life cycle, in other words, the types of operations provided to the individual. For example, data (chain data) representing a history of change of the management ID is generated. The data may be in a graph format. For this, the individual information manager 109 acquires, by using the previous process individual information acquirer 112, analysis data including the times of operations performed in higher-level processes (the previous process and one or more process at the higher level), the types of the operations, the management IDs (pre-operation management IDs) of the individual before the operations, the management IDs (post-operation management IDs) after the operations and the like. Chain data in which the analysis data is connected in a chain is obtained by connecting the acquired analysis data between adjacent processes through the same management ID. The chain data indicates change of the unit of management of an individual, in other words, an operation history. The chain data is displayed on the display 114. Subsequently, a sequence to generate the chain data as a chain graph in a graph format will be described below with reference to FIG. 13.

Figure 13:
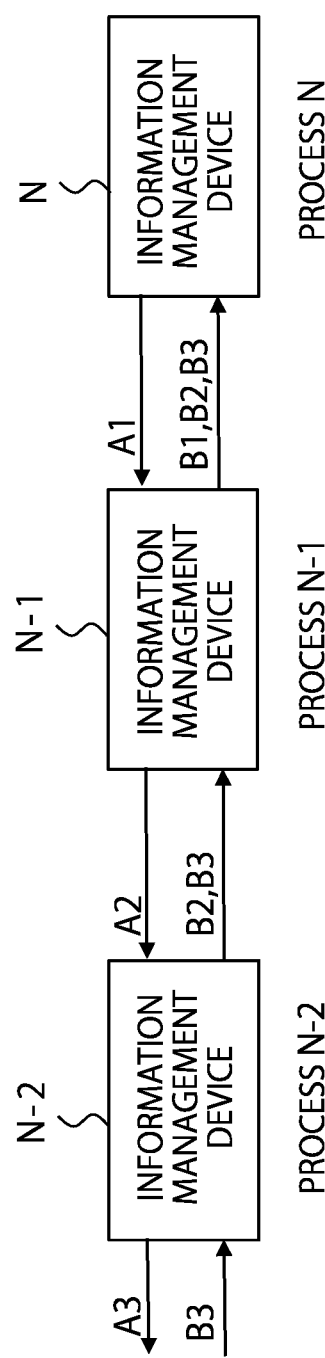
FIG. 13 is an explanatory diagram of a sequence to generate a chain graph.

FIG. 13 is an explanatory diagram of the sequence to generate a chain graph. The own-process is referred to as Process N, a process one level higher is referred to as Process N−1, and a process another one level higher is referred to as Process N−2. Information management devices N, N−1, and N−2 are arranged for the respective processes.

The individual information manager 109 of the information management device N of the own-process (Process N) specifies the management ID of an individual instructed by the user (the management ID of an individual after an operation in the own-process). The individual identification change history data including the specified management ID in Item 4 is specified in the individual identification change history DB 108 (refer to FIG. 11). The user specifies the management ID in this example, but may specify optional information included in Item 4 of the individual identification change history data, such as a pair of the management ID and the individual manufacturing ID.

The individual information manager 109 of the information management device N generates analysis data in the own-process by associating the time in Item 1, the type of the operation in Item 2, the pre-operation management ID in Item 3, and the post-operation management ID in Item 4 in the specified individual identification change history data. The analysis data corresponds to, for example, the first data.

In addition, the individual information manager 109 of the information management device N specifies the event compression value in Item 3 (the event compression value of the previous process) from the specified individual identification change history data. An information acquisition request A1 including the specified event compression value is generated and transmitted to the information management device N−1 of Process N−1. The information acquisition request A1 may include the pre-operation management ID in Item 3. The information acquisition request A1 corresponds to, for example, a second information acquisition request.

The individual information manager 109 of the information management device N–1 specifies, from the individual identification change history DB 108 (refer to FIG. 11), the individual identification change history data including, in Item 5, the event compression value included in the information acquisition request A1. The time of the operation, the type of the operation, the pre-operation management ID, and the post-operation management ID are specified from the specified individual identification change history data. The time of the operation, the type of the operation, the pre-operation management ID, and the post-operation management ID thus specified are associated to generate analysis data B1 in the previous process (Process N–1). The analysis data B1 is transmitted to the information management device N of Process N. The previous process individual information acquirer 112 of the information management device N receives the analysis data B1 in Process N–1 and provides the received analysis data B1 to the individual information manager 109 of the information management device N. The analysis data B1 corresponds to, for example, the second data.

In addition, the individual information manager 109 of the information management device N–1 specifies the event compression value in Item 5 from the specified individual identification change history data. The previous process individual information acquirer 112 of the information management device N–1 generates an information acquisition request A2 including the specified event compression value and transmits the generated information acquisition request A2 to the information management device N–2 of Process N–2. The information acquisition request A2 may include the pre-operation management ID in Item 3.

The information management device N–2 generates analysis data B2 in Process N–2 through a sequence same as that of the information management device N–1 and transmits the generated analysis data B2 to the information management device N–1. The previous process individual information acquirer 112 of the information management device N–1 transmits the analysis data B2 received from the information management device N–2 to the information management device N through the individual information manager 109. The previous process individual information acquirer 112 of the information management device N receives the analysis data B2 in Process N–2 and provides the received analysis data B2 to the individual information manager 109.

Subsequently, the same sequence is repeated at the information management device before Process N–3 (refer an information acquisition request A3 transmitted to Process N–3 and analysis data B3 to in Process N–3 in the drawing).

In this manner, the analysis data of Process N as the own-process and the higher-level processes (at least one higher-level process) is collected to the individual information manager 109 of Process N. When no higher-level process exists for a process, tracing back to the higher-level process is not performed. The individual information manager 109 of the information management device N connects the acquired analysis data of the processes to generate a chain graph.

When having received an information acquisition request from the information management device of Process N+1 one level lower, the information management device N generates analysis data similarly to a sequence when the information management device N–1 receives an information acquisition request from the information management device N. Specifically, the analysis data is generated based on the operation history event in Process N. Then, the generated analysis data is transmitted to the information management device of Process N+1. The information acquisition request received from the information management device of Process N+1 one level lower corresponds to, for example, a first information acquisition request.

In the above-described sequence, the information acquisition request transmitted from each process may further include at least one of the belonging ID, the individual class ID, and the individual manufacturing ID in addition to the management ID. In addition, the analysis data collected from each process may include at least one of the belonging ID, the individual class ID, and the individual manufacturing ID of the individual after the operation in the process.

In the above-described sequence, the analysis data of each higher-level process is acquired for an individual of interest, but the transaction information corresponding to the post-operation management ID in each process may be collected. Accordingly, details of a transaction of the individual can be understood. For example, it is possible to understand where the individual is produced, provided with which operation at which business operator, and transferred through which circulation path.

Figure 14:
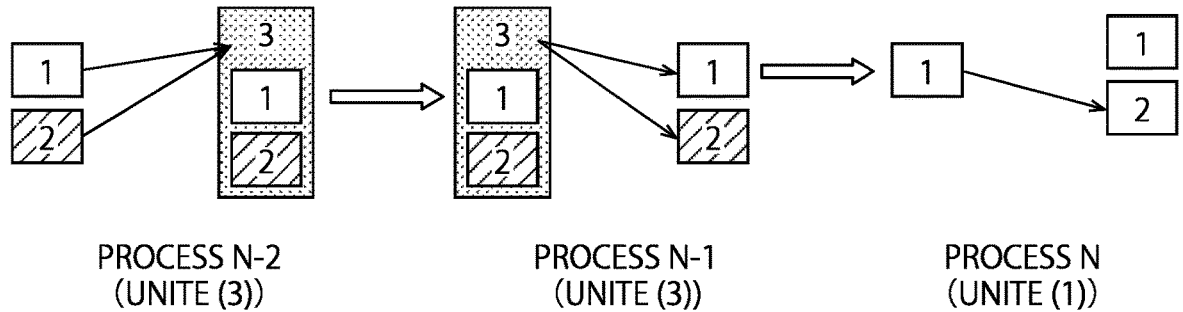
FIG. 14 is a diagram schematically illustrating an exemplary chain graph indicating transition of the type of an operation.

FIG. 14 schematically illustrates an exemplary chain graph generated by the individual information manager 109 of the information management device N. The management ID of Individual 3 after the operation in the analysis data of Process N–2 is connected with the management ID of Individual 3 before the operation in the analysis data of Process N–1 (refer to a bold arrow). The management ID of Individual 1 after the operation in the analysis data of Process N–1 is connected with the management ID of Individual 1 before the operation in the analysis data of Process N. In this chain graph, it is understood from the analysis data of Process N–2 that Individuals 1 and 2 are united into Individual 3 through Unite Operation (3). Each individual can be identified specifically when the individual manufacturing ID is used, but each individual is not identified when the individual manufacturing ID is not used. Thus, transition of the type of each operation provided to an individual and a transaction thereof are checked in the unit of management.

In addition, it is understood from the analysis data of Process N–1 that Individuals 1 and 2 are taken out of Individual 3 through Divide Operation (3) and Individual 3 is excluded as a management target (for example, when packing containers used to convey Individuals 1 and 2 are discarded). In addition, it is understood from the analysis data of Process N that part of Individual 1 is taken out as Individual 2 and the other part remains as Individual 1. Specifically, it is understood that part of Individual 1 is separated as Individual 2 through Divide Operation (1). In this manner, it is possible to understand which types of operations are provided to an individual of interest in Process N (for example, Individual 2 having a management ID specified by the user).

The transaction information of an individual after the operation in each process may be displayed in association with the individual after the operation in the process in the chain graph.

Figure 15:
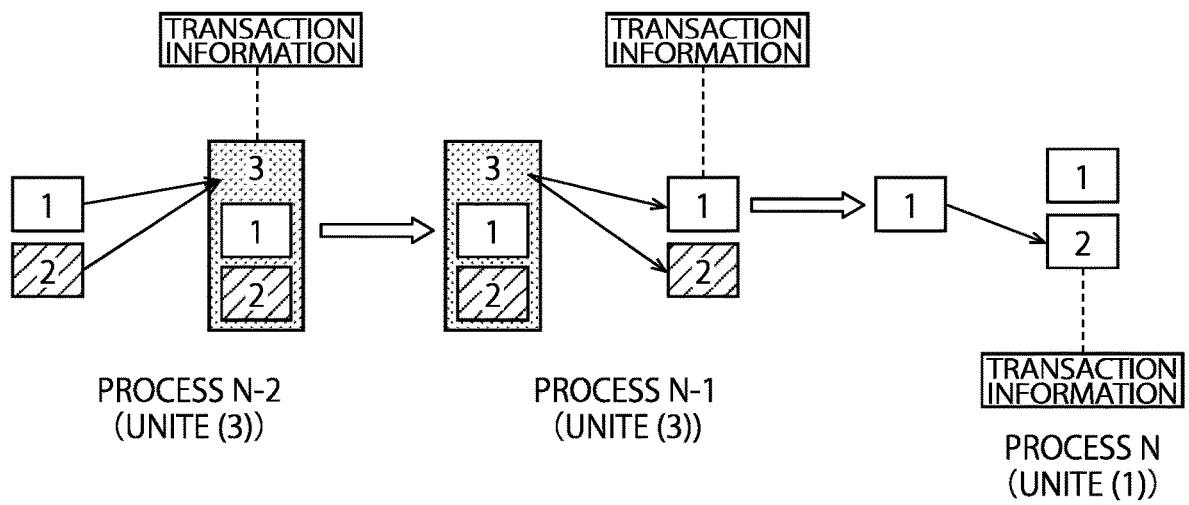
FIG. 15 is a diagram illustrating an example in which the chain graph is displayed in association with transaction information.

FIG. 15 illustrates an example in which the transaction information is associated with each individual after the operation in Process N–2, Process N–1, and Process N. This example is focused on Individual 2 after the operation in Process N. The transaction information is acquired from the transaction information DB of the information management device of each process through the management ID. Accordingly, it is possible to understand details such as where the individual is produced, provided with which operation at which business operator, and transferred through which circulation path.

In addition, the individual information manager 109 of the information management device can determine whether a history of change of management between processes, in other words, transition of the type of an operation has no inconsistency based on the collected analysis data. For example, when pieces of the analysis data cannot be connected with each other through the same management ID, a chain graph cannot be created, and in this case, it is determined that change of the management ID or a history of transition of the type of an operation has inconsistency.

Figure 16:
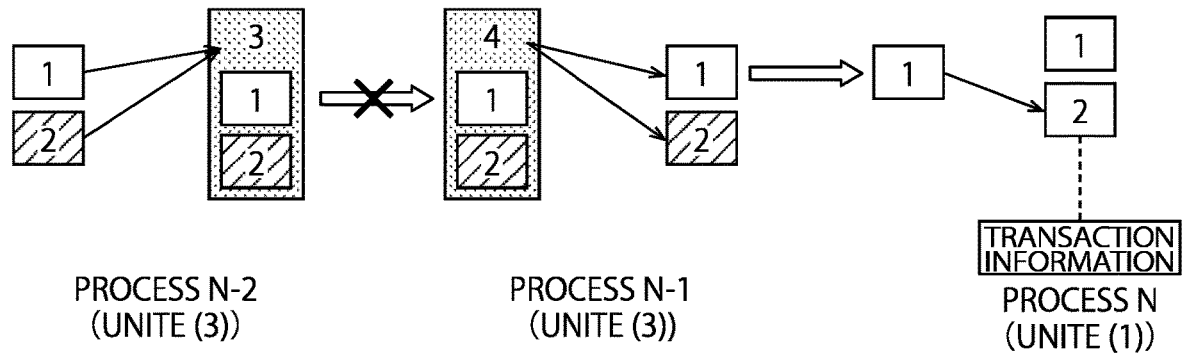
FIG. 16 is a diagram schematically illustrating an example in which generation of the chain graph fails.

FIG. 16 schematically illustrates an example in which generation of a chain graph fails. In this case, the analysis data cannot be connected between Processes N−2 and N−1. This is because the management ID of the individual after the operation in Process N−2 does not match the management ID of the individual before the operation in Process N−1. Thus, in this case, a place where connection between the management IDs fails is displayed as a place having inconsistency. In the drawing, a place having inconsistency is identified by a cross. An exemplary reason for the occurrence of inconsistency is that an error occurs at writing to the IC tag of the individual after the operation in Process N−2. For example, the event compression value is correctly written but the management ID (post-operation management ID) of the individual after the operation is changed to another value due to a writing error. Alternatively, an error occurs at reading from the IC tag attached to the individual after the operation in Process N−2. For example, the event compression value is correctly read but the management ID (post-operation management ID) of the individual after the operation is changed to another value due to a reading error. Alternatively, the management ID is rewritten to another value due to some operation error by the user. Various other reasons why inconsistency occurs can be thought.

Another example is described below. Unite Operation (3) in FIG. 7 and Divide Operation (3) in FIG. 8 have a correspondence relation therebetween as described above. Thus, it is inconsistent that Divide Operation (4) follows Unite Operation (3). Thus, an inconsistent transition pattern (inconsistency pattern) of the type of an operation is defined in advance, and when transition matches the inconsistency pattern, it is determined that a history of the type of an operation has inconsistency.

Figure 17:
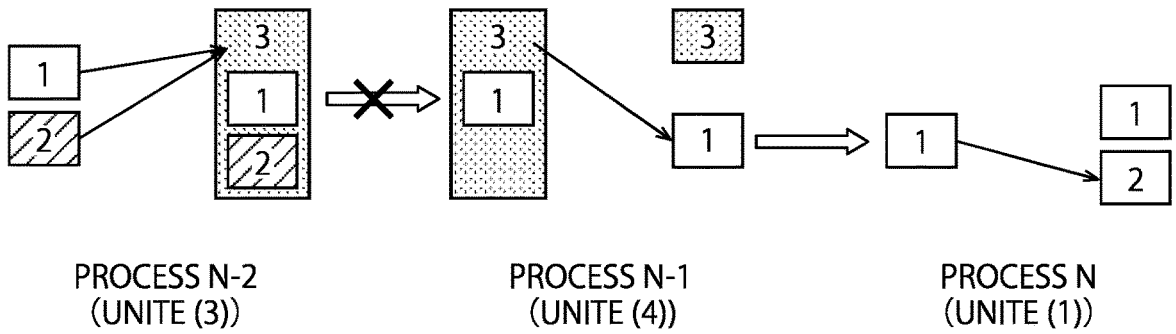
FIG. 17 is a diagram illustrating an example in which transition of the type of an operation has inconsistency.

FIG. 17 illustrates an example in which transition of the type of an operation has inconsistency. Divide Operation (4) is performed after Unite Operation (3). Assume that "Unite Operation (3)→Divide Operation (4)" is registered as the inconsistency pattern. In this case, it can be determined that transition between Processes N−2 and N−1 has inconsistency. The inconsistency pattern may be stored in an optional storage device accessible from the individual information manager 109. The number of inconsistency patterns may be one or may be two or more.

Inconsistency in transition of the type of an operation may be detected by using machine learning or the like. For example, a transition pattern of the operation type is acquired from a history of operations on various individuals in the past by machine learning. It is determined that there is inconsistency when the current transition pattern of the operation type match no past transition pattern or is included in no transition pattern.

Alternatively, it may be determined whether the current transition pattern is similar to a past transition pattern by using a method such as graph matching, and when the current transition pattern is similar to no past transition pattern, it may be determined that there is inconsistency. For example, similarity of the current transition pattern with a past transition pattern is calculated. The similarity indicates a degree at which the transition patterns are approximate to each other. A larger value of the similarity indicates that the transition patterns are more approximate to each other. An exemplary method of calculating the similarity is described below. A different value is allocated to each operation type, and each transition pattern is expressed by a column (value column) of a plurality of values corresponding to a plurality of operation types. The sum of absolute difference (or square of the sum of absolute difference) between the value columns of the transition patterns is calculated. Specifically, the absolute value of the difference between the values of corresponding elements of the transition patterns is calculated, and the absolute value is summed over each pair of elements. The similarity is the reciprocal of the sum of absolute difference. When the similarity is equal to or larger than a threshold value, it is determined that the transition patterns are similar to each other. When the similarity is smaller than the threshold value, it is determined that the transition patterns are not similar to each other. When the lengths of the value columns are different from each other, the similarity is calculated with the shorter value column aligned with one end side of the longer value column, and then the similarity is calculated at each position shifted by one element sequentially to the other end of the longer value column. For example, the maximum value, the minimum value, the average value, or the median of the calculated similarities is employed as the similarity between the transition patterns.

In the above-described embodiment, Items 1 to 4 in FIG. 11 are used to calculate the event compression value, but the event compression value may be calculated without using Item 4 (such as the post-operation management ID). In other words, the event compression value may be calculated for Items 1 to 3. Accordingly, cases in which the event compression value (Item 5) is same but the post-operation management ID is different in the own-process can be allowed. Accordingly, in the next process, it can be understood by comparing a pair of the event compression value and the post-operation management ID that a plurality of individuals provided with different operations in the own-process is provided with the same operation in a process before the own-process.

In the above-described embodiment, description is performed based on an assumption that one operation is performed in one process, but a plurality of operations may be performed in a process. In this case, it can be interpreted that a plurality of sub processes exist in a process, one operation is performed in each sub process, and the above-described sequence is performed. One information management device 100 may be arranged for a plurality of sub processes, or the information management device 100 may be arranged for each sub process. When one information management device 100 is arranged for a plurality of sub processes, writing and reading of the tag information to and from a medium (such as an IC tag) between the sub processes may be omitted.

Specific Example 1

Figure 18:
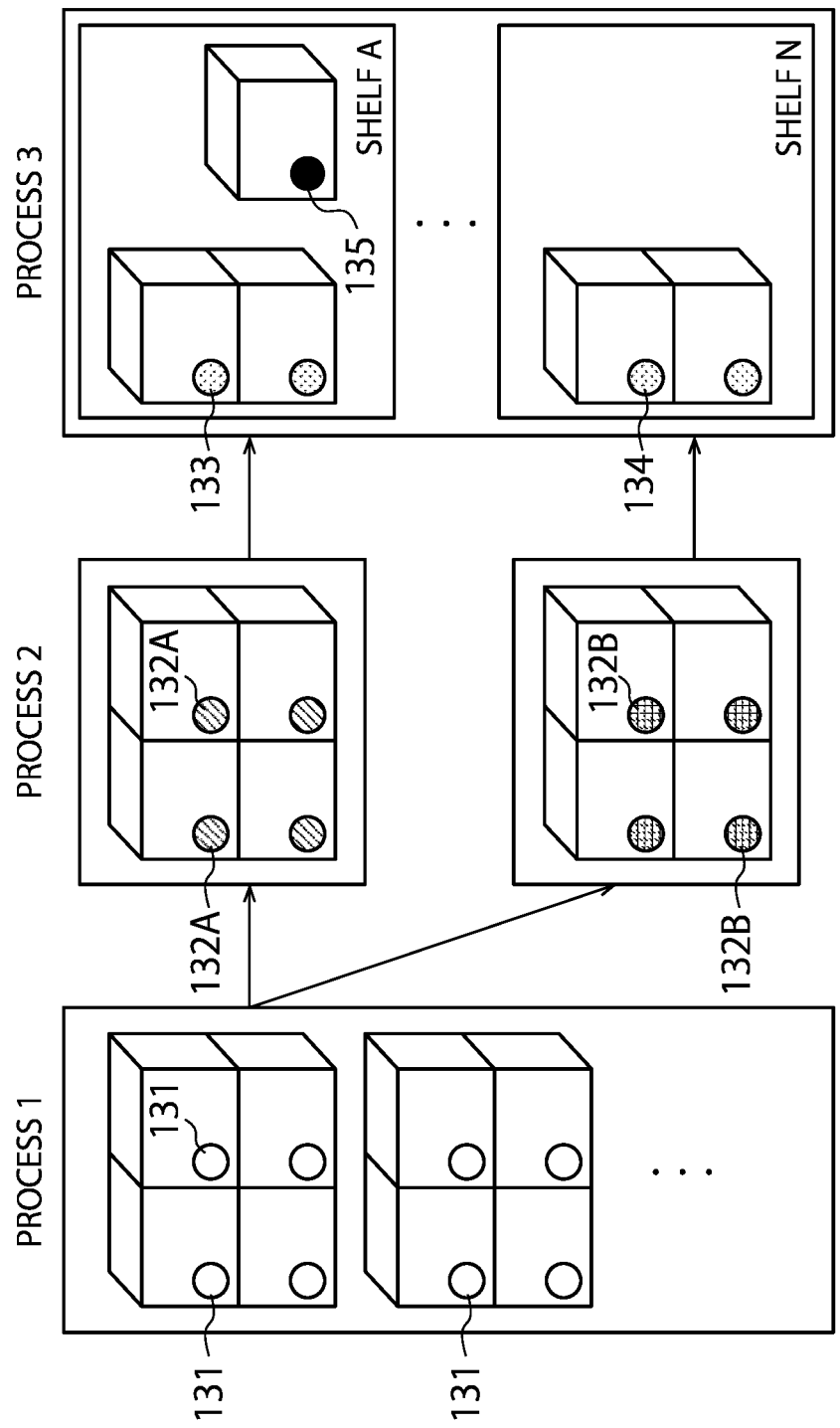
FIG. 18 is a diagram for describing Specific Example 1 of the present embodiment.

FIG. 18 is a diagram for description of Specific Example 1 of the present embodiment. In Process 1, 20 lettuces are produced in expectation, and after the production, an order for shipment of 8 lettuces is received from a business entity of Process 2. In Process 1, eight lettuces are separated from the 20 lettuces and packed and shipped in a packing container (such as a cardboard box). In Process 2, eight lettuces are taken out of the received packing container, divided into two sets of four lettuces, and delivered to Process 3 with each set packed in a packing container. In Process 3, the lettuces in each packing container received from Process 2 are divided and disposed on a plurality of shelves. In the present example, the belonging ID and the individual class ID in addition to the management ID are used as identifiers related to an individual. However, the individual manufacturing ID is not allocated to each lettuce.

[Process 1]

In Process 1, two sub processes are performed, and 20 lettuces are produced in the first sub process. For the production, the create operation is acquired as the type of an operation. The create operation is expressed as, for example, "( )create1". For example, the create operation is specified through inputting from the user. Although an amount is not specified, specification of an amount is not excluded. Since no process exists before Process 1, the tag information of the previous process does not exist. In other words, the event compression value and the pre-operation management ID (Item 3 in FIG. 11) are null. Assume that the belonging ID of the lettuces is A671, the management ID (for example, the slip number of an order for production of 20 lettuces) is M792, and the individual class ID (kind number of the lettuces) is C675. Specifically, (the belonging ID, the management ID, the individual class ID) are (A671, M792, C675).

Although, for description, the leading letter of a string indicating the belonging ID is A, the leading letter of a string indicating the management ID is M, and the leading letter of a string indicating the individual class ID is C, another form such an optional string is applicable in reality.

Assume that the time of ( )create1 is 2019/01/11/11:30:30.

Since the tag information of the previous process does not exist, a connection of the strings of 2019/01/11/11:30:30, ( )create1, and (A671, M792, C675) is compressed. The event compression value is calculated as, for example, SHA12345. Although, for description, the leading letters of a string indicating the event compression value are SHA, another form such as an optional string is applicable in reality.

In the second sub process of Process 1, eight of the 20 lettuces are taken out (divide), and the eight lettuces are collected (unite) and shipped to Process 2. In other words, continuation of Divide Operation (1) and Unite Operation (3) is acquired as the type of an operation. These continuous operations are expressed as, for example, "(divide1)unite3". Although each operation may be separately performed, processing can be simplified when the operations are continuously performed. For example, the number of times of issuing the management ID can be reduced by one.

Assume that the time of (divide1)unite3 is 2019/01/16/11:30:30.

For a sub process performed before (divide1)unite3, (the event compression value, the belonging ID, the management ID, the individual class ID) are (SHA12345, A671, M792, C675).

For an individual (the set of eight lettuces) as the target of the second sub process, the belonging ID is A366, the management ID is M485, and the individual class ID is null.

Accordingly, a connection of the strings of 2019/01/16/11:30:30, (divide1)unite3, (SHA12345, A671, M792, C675), and (A366, M485) is compressed. For example, SHA12378 is calculated as the event compression value.

The tag information including (SHA12378, A366, M485, C675) as (the event compression value, the belonging ID, the management ID, the individual class ID) is stored in a medium 131. The individual class ID has a value in the previous sub process. The medium 131 is attached to, for example, a packing container in which the eight lettuces are delivered. Alternatively, the medium 131 may be attached to each lettuce. Although the drawing illustrates an example in which the medium 131 is attached to each lettuce, the medium 131 may be attached to the packing container.

Although writing of the tag information to the medium is not performed in the first sub process, the writing of the tag information to the medium may be performed, and then reading of the tag information may be performed in the second sub process.

[Process 2]

In Process 2, the eight lettuces are taken out of the packing container received from Process 1, divided into two sets of four lettuces, and delivered in packing containers. In other words, continuation of Divide Operation (3) and Unite Operation (3) is acquired as the type of an operation. These continuous operations are expressed as "(divide3)unite3".

Assume that the time of (divide3)unite3 is 2019/01/21/11:30:30.

From the tag information of the previous process (the second sub process of Process 1), which is read from the medium attached to the packing container, (SHA12378, A366, M485, C675) are obtained as (the event compression value, the belonging ID, the management ID, the individual class ID).

For one individual (set of four lettuces) after the operation in Process 2, the belonging ID is A235, the management ID is M451 (such as the slip number of a delivery order), and the individual class ID is null.

Accordingly, a connection of the strings of 2019/01/21/11:30:30, (divide3)unite3, (SHA12345, A366, M485, C675), (A235, M451) is compressed. For example, SHA22321 is calculated as the event compression value.

The tag information including (SHA22321, A235, M451, C675) as (the event compression value, the belonging ID, the management ID, the individual class ID) is stored in a medium 132A. The individual class ID has a value in the previous process. The medium 132A is attached to, for example, a packing container in which the four lettuces are delivered. Alternatively, the medium 132A may be attached to each lettuce. Although the drawing illustrates an example in which the medium 132A is attached to each lettuce, the medium 132A may be attached to the packing container. The packing container is delivered to a business operator of Process 3.

The same operation (divide3)unite3 is acquired for the other individual (set of four lettuces) after the operation in Process 2. The time thereof is 2019/01/21/11:30:30, which is same as described above.

In the tag information from the previous process (second sub process of Process 1), (the event compression value, the belonging ID, the management ID, the individual class ID) are (SHA12378, A366, M485, C675), which is same as described above.

For the other individual (set of four lettuces) after the operation in Process 2, the belonging ID is A235, the management ID is M452 (such as the slip number of a delivery order), and the individual class ID is null.

Accordingly, a connection of the strings of 2019/01/21/11:30:30, (divide3)unite3, (SHA12345, A366, M485, C675), (A235, M452) is compressed. For example, SHA22348 is calculated as the event compression value.

The tag information including (SHA22348, A235, M452, C675) as (the event compression value, the belonging ID, the management ID, the individual class ID) is stored in a medium 132B. The medium is attached to, for example, the packing container in which four lettuces are delivered. The packing container is delivered to the business operator of Process 3. Alternatively, the medium 132B may be attached to each lettuce. Although the drawing illustrates an example in which the medium 132B is attached to each lettuce, the medium 132B may be attached to the packing container. The packing container is delivered to the business operator of Process 3.

[Process 3]

In Process 3, the four lettuces in the one packing container delivered from Process 2 are divided into two pairs of two lettuces and disposed on separate shelves. The same operation is performed on the other packing container delivered from Process 2. The following description will be made on the one packing container.

The four lettuces are taken out of the one packing container, divided into two pairs of two lettuces, and disposed on separate shelves. In other words, continuation of Divide Operation (3) and Unite Operation (4) is acquired as the type of an operation. These continuous operations are expressed as "(divide3)unite4".

Assume that the time of (divide3)unite4 is 2019/01/22/11:30:30 for one of the pairs.

From the tag information of the previous process (Process 2), which is read from the medium attached to the packing container, (SHA22321, A235, M451, C675) are obtained as (the event compression value, the belonging ID, the management ID, the individual class ID).

For the one pair (set of two lettuces) as an individual after the operation in Process 3, the belonging ID is A183, the management ID is M421, and the individual class ID is null. The management ID is, for example, a number identifying the shelf.

Accordingly, a connection of the strings of 2019/01/22/11:30:30, (divide3)unite4, (SHA22321, A235, M451, C675), and (A183, M421) is compressed. For example, SHA24321 is calculated as the event compression value. The event compression value may be calculated without using Item 4 of the operation history event, in other words, (A183, M421) as described above.

The tag information including (SHA24321, A183, M421, C675) as (the event compression value, the belonging ID, the management ID, the individual class ID) is stored in a medium 133. The individual class ID has a value in the previous process. The medium 133 is attached to the pair of lettuces. Alternatively, the medium 133 may be attached to each lettuce. Although the medium 133 is attached to each lettuce in the drawing, the medium 133 may be attached to the pair of lettuces. The pair of lettuces are stored on Shelf A. In addition, another foodstuff to which a medium 135 including other tag information is attached is disposed on Shelf A.

Assume that the time of (divide3)unite4 is 2019/01/22/11:30:30 for the other pair of two lettuces as well.

From the tag information of the previous process (Process 2), similarly to the above description, (SHA22321, A235, M451, C675) are obtained as (the event compression value, the belonging ID, the management ID, the individual class ID).

For the other pair (set of two lettuces) as an individual after the operation in Process 3, the belonging ID is A183, the management ID is M422, and the individual class ID is null.

Accordingly, a connection of the strings of 2019/01/22/11:30:30, (divide3)unite4, (SHA22321, A235, M451, C675), (A183, M422) is compressed. For example, SHA24373 is calculated as the event compression value. As described above, the event compression value may be calculated without Item 4 of the operation history event, in other words, (A183, M422).

The tag information including (SHA24373, A183, M422, C675) as (the event compression value, the belonging ID, the management ID, the individual class ID) is stored in a medium 134. The medium 134 is attached to the other pair. Alternatively, the medium 134 may be attached to each lettuce. Although the medium 134 is attached to each lettuce in the drawing, the medium 134 may be attached to the other pair. The other pair is stored on Shelf N.

Specific Example 2

No individual manufacturing ID is allocated to each lettuce in Specific Example 1, but the present example describes a case in which the individual manufacturing ID is allocated to each lettuce. Description same as that of Specific Example 1 is omitted.

[Process 1]

The create operation (( )create1) is acquired for each of eight lettuces for which a shipment order is provided. Thus, the create operation is acquired eight times. Assume that the times of the eight create operations are same at 2019/01/11/11:30:30. The belonging ID, the management ID (such as the slip number of a manufacturing order), the individual class ID, and the individual manufacturing ID of the first lettuce are obtained as a data set (A671, M792, C675, I555). Although, for description, the leading letter of a string indicating the individual manufacturing ID is I, another form such as an optional string is applicable in reality. The data set of the first lettuce is denoted by ND1. Similarly for the other seven lettuces, data sets ND2 to 8 are obtained. The belonging ID, the management ID, and the individual class ID are same but only the individual manufacturing ID is different among the lettuces.

For the first lettuce, a connection of the time of the operation, ( )create1, the belonging ID, the management ID, and the individual class ID in the data set ND1 is compressed. For example, SHA56789 is calculated as the event compression value. The individual manufacturing ID is not used in calculation of the event compression value. Similarly, the event compression value is calculated for each of the second to eighth lettuces. Since the times of the create operations are same, the event compression values of the lettuces are same.

An operation to pack the eight lettuces in a packing container for shipment is performed. Unite Operation (3) is acquired for each lettuce. The time of Unite Operation (3) is same at 2019/01/16/11:30:30 for each lettuce. The individual after the operation is the set of eight lettuces or the packing container in which the eight lettuces are placed. The belonging ID is A366, the management ID is M485 (for example, the slip number of the shipment order), and the individual class ID and the individual manufacturing ID are null.

For the first lettuce, a connection of the strings of 2019/01/22/11:30:30, unite3, (SHA56789, A671, M792, C675), and (A366, M485) is compressed. For example, SHA5789 is calculated as the event compression value. The individual manufacturing ID is not used in calculation of the event compression value. Similarly, the event compression value is calculated for each of the second to eighth lettuces. Since the times of Unite Operations (3) are same, the event compression values are same.

For the first lettuce, the tag information including (SHA56789, A366, M485, C675, I555) as (the event compression value, the belonging ID, the management ID, the individual class ID, the individual manufacturing ID) is generated and stored in the medium 131 (refer to FIG. 18). The medium 131 is attached to the first lettuce. Similarly, the tag information is generated for each of the second to eighth lettuces and stored in the medium 131, and the medium 131 is attached to the corresponding lettuce. In the tag information, only the individual manufacturing ID differs among the second to eighth lettuces, and the values of the other items are same.

[Process 2]

In Process 2, the eight lettuces received from Process 1 are taken out of the packing container, and a set of four lettuces are delivered in a packing container to Process 3. Similarly, the other four lettuces are delivered as a set in a packing container. The following describes an example in which the first set of four lettuces are delivered.

Unite Operation (3) (( )unite3) is acquired for packing of the first lettuce into a packing container. Assume that the time of the unite operation is 2019/01/21/11:30:30.

From the tag information of the previous process (Process 1), (SHA56789, A366, M485, C675, I555) are obtained as (the event compression value, the belonging ID, the management ID, the individual class ID, the individual manufacturing ID).

For the individual after the operation in Process 2, the belonging ID is A235, the management ID is M451, and the individual class ID is null.

Accordingly, a connection of the strings of 2019/01/21/11:30:30, ( )unite3, (SHA56789, A366, M485, C675), and (A235, M451) is compressed. For example, SHA57812 is calculated as the event compression value. The individual manufacturing ID in the tag information is not used in calculation of the event compression value.

For the first lettuce, the tag information including (SHA57812, A235, M451, C675, I555) as (the event compression value, the belonging ID, the management ID, the individual class ID, the individual manufacturing ID) is generated and stored in the medium 132A (refer to FIG. 18) for the lettuce. In reality, the tag information may be overwritten on the medium 131 attached in Process 1. Similarly, the tag information is generated for each of the second to fourth lettuces and stored in the medium 132A for the lettuce. In reality, for the second to fourth lettuces as well, the tag information may be overwritten on the medium 131 attached in Process 1. In the tag information, only the individual manufacturing ID differs among the first to fourth lettuces, and the values of the other items are same.

[Process 3]

In Process 3, the four lettuces in one of the packing containers delivered from Process 2 are divided into two pairs of two lettuces and disposed on separate shelves. The same operation is performed for the other packing container delivered from Process 2. The following description will be made on the one packing container.

The four lettuces are taken out of the one packing container, divided into two pairs of two lettuces, and disposed on separate shelves. This operation corresponds to execution of Unite Operation (4) (( )unite4) for each pair of lettuces.

Assume that the time of ( )unite4 is 2019/01/22/11:30:30 for the first lettuce of the first pair. From the tag information stored in the medium, (SHA57812, A235, M451, C675, I555) are obtained as (the event compression value, the belonging ID, the management ID, the individual class ID, the individual manufacturing ID).

For the individual after the operation (individual placed on the shelf) of Process 3, the belonging ID is A183, the management ID is M421, and the individual class ID and the individual manufacturing ID are null.

Accordingly, a connection of the strings of 2019/01/22/11:30:30, ( )unite4, (SHA57812, A235, M451, C675), and (A183, M421) is compressed. For example, SHA59923 is calculated as the event compression value. The individual manufacturing ID in the tag information is not used in calculation of the event compression value.

The tag information including (SHA59923, A235, M451, C675, I555) as (the event compression value, the belonging ID, the management ID, the individual class ID, the individual manufacturing ID) is generated and stored in the medium 133. Similarly for the second lettuce, the tag information is generated and stored in the medium 133 for the lettuce. In reality, the tag information may be overwritten on the medium 131 attached in Process 1 or the medium 132A attached in Process 2. The tag information is same for the first and second lettuces except that the individual manufacturing ID is different.

Similarly to a case of the lettuces of the first pair, the tag information is generated for each lettuce of the second pair and stored in the medium 134 for the lettuce. In reality, the tag information may be overwritten on the medium 131 attached in Process 1 or the medium 132A attached in Process 2. The tag information is same for the lettuces of the second pair except that the individual manufacturing ID is different. The belonging ID and the individual class ID in the tag information of the lettuces of the second pair are same as those of the lettuces of the first pair, but the event compression value, the management ID, and the individual manufacturing ID are different.

Specific Example 3

Figure 19:
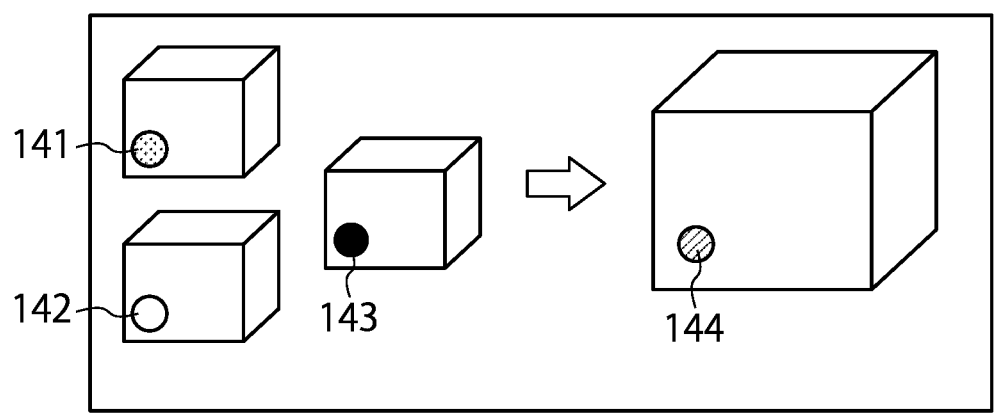
FIG. 19 is a diagram for describing Specific Example 3 of the present embodiment.

FIG. 19 is a diagram for description of Specific Example 3 of the present embodiment. In Process 11, a case is assumed in which a lettuce, a potato, and a bacon as three foodstuffs are taken out of a plurality of lettuces, a plurality of potatoes, and a plurality of bacons, respectively, on shelves of a refrigerator, and a processed food product is produced by using the foodstuffs thus taken out and is sold. A medium is attached to each foodstuff. No individual manufacturing ID is allocated to each foodstuff. In the present example, the belonging ID and the individual class ID are used in addition to the management ID. In the drawing, a foodstuff to which a medium 141 is attached is the lettuce, a foodstuff to which a medium 142 is attached is the potato, and a foodstuff to which a medium 143 is attached is the bacon.

A continuation of three Divide Operations (1) and Unite Operation (2) is acquired as the type of an operation to take out the three foodstuffs and produce a processed food product by cooking. These continuous operations are expressed as "(divide1, divide1, divide1)unite2". For each divide operation, it may be sensed, when the corresponding foodstuff is taken out of the refrigerator, that the foodstuff is taken out through a sensor and may acquire divide1. It may be sensed that the three foodstuffs are put into a cookware, and unite2 may be acquired. The operation acquisition may be performed when it is sensed that the user takes out the three foodstuffs and performs an input that instructs to cook the three foodstuffs. Sensing may be performed by a method other than the above-described method. Assume that the time of (divide1, divide1, divide1)unite2 is 2019/01/31/11:30:30.

From the tag information read from the medium 141 of the lettuce, (SHA24321, A183, M421, C675) are obtained as (the event compression value, the belonging ID, the management ID, the individual class ID).

From the tag information read from the medium 142 of the potato, (SHA25321, A183, M423, C360) are obtained as (the event compression value, the belonging ID, the management ID, the individual class ID). From the tag information read from the medium 143 of the bacon, (SHA26321, A183, M424, C485) are obtained as (the event compression value, the belonging ID, the management ID, the individual class ID).

For the processed food product after the operation in Process 11, the belonging ID is A945, the management ID is M257, and the individual class ID is I332.

Accordingly, a connection of the strings of 2019/01/31/11:30:30, (divide1, divide1, divide1)unite2, (SHA24321, A183, M421, C675), (SHA25321, A183, M423, C360), (SHA26321, A183, M424, C485), and (A945, M257, I332) is compressed. For example, SHA27321 is calculated as the event compression value.

The tag information including (SHA27321, A945, M257, I332) as (the event compression value, the belonging ID, the management ID, the individual class ID) is stored in a medium 144. The medium 144 is attached to, for example, a package of the processed food product. When the processed food product is sold, the processed food product may be excluded as a management target by performing the delete operation (refer to FIG. 10).

In the present example, some of a plurality of lettuces are used, but when all lettuces are used, Divide Operation (4) may be acquired as the type of an operation. This is same for the other foodstuffs.

Specific Example 4

In Specific Example 3, no individual manufacturing ID is allocated to each foodstuff, but the present example describes a case in which the individual manufacturing ID is allocated to each foodstuff. Description same as that of Specific Example 3 is omitted.

[Process 11]

In the present example as well, similarly to Specific Example 3, a continuation of three Divide Operations (1) and Unite Operation (2) is acquired as the type of an operation. These continuous operations are expressed as "(divide1, divide1, divide1)unite2". Assume that the time of (divide1, divide1, divide1)unite2 is 2019/01/31/11:30:30.

From the tag information read from the medium 141 of the lettuce, (SHA71001, A183, M421, C675, I555) are obtained as (the event compression value, the belonging ID, the management ID, the individual class ID, the individual manufacturing ID).

From the tag information read from the medium 142 of the potato, (SHA71589, A183, M423, C360, I660) are obtained as (the event compression value, the belonging ID, the management ID, the individual class ID, the individual manufacturing ID).

From the tag information read from the medium 143 of the bacon, (SHA71525, A183, M424, C485, I770) are obtained as (the event compression value, the belonging ID, the management ID, the individual class ID, the individual manufacturing ID).

For the processed food product after the operation in Process 11, the belonging ID is A945, the management ID is M257, the individual class ID is I332, and the individual manufacturing ID is I150.

Accordingly, a connection of the strings of 2019/01/31/11:30:30, (divide1, divide1, divide1)unite2, (SHA71001, A183, M421, C675), (SHA71589, A183, M423, C360), (SHA71525, A183, M424, C485), and (A945, M257) is compressed. For example, SHA77321 is calculated as the event compression value. No individual manufacturing ID is used in calculation of the event compression value.

The tag information including (SHA77321, A945, M257, I332, I150) as (the event compression value, the belonging ID, the management ID, the individual class ID, the individual manufacturing ID) is generated and stored in the medium 144.

In the present example as well, similarly to Specific Example 3, Divide Operation (4) may be acquired as the type of an operation when all lettuces in the refrigerator are used. This is same for the other foodstuffs.

The present embodiment mainly describes a case in which the operation acquirer 105 acquires the type of an operation, but the operation may be acquired. For example, when a lettuce is produced, the "create operation" is acquired in the embodiment, but "produce a lettuce" is acquired when the operation is acquired. In this case, the same sequence can be achieved by replacing "the type of an operation" with "an operation" in the above description of each component.

According to the present embodiment, since the individual identification change history data or the operation history event is generated in each process and managed in a distributed manner, it is possible to easily manage information of an individual, the unit of management of which changes, for example, understanding of transition of the types of operations performed on the individual. It is unnecessary to prepare a mapping table common to a plurality of business entities, which leads to cost reduction. Since operation histories of the processes are managed for the respective processes in a distributed manner, scalability can be maintained. Since an individual is managed with the management ID or the like, the individual can be a management target even when the individual has no individual manufacturing ID.

In addition, since the operation history event is compressed to the event compression value, it is possible to fast search the individual identification change history DB. Since the event compression value has a fixed length, it is easy to record the event compression value on a tag or a bar code. Since some business entities desire to keep, secret to parties of a transaction, the operation history event, in other words, information of an individual, it is possible to achieve chain transfer of the information of the individual by allowing the event compression value as a key value for identification and trace to be decrypted only by the parties (not to be decrypted by those other than the parties).

Figure 20:
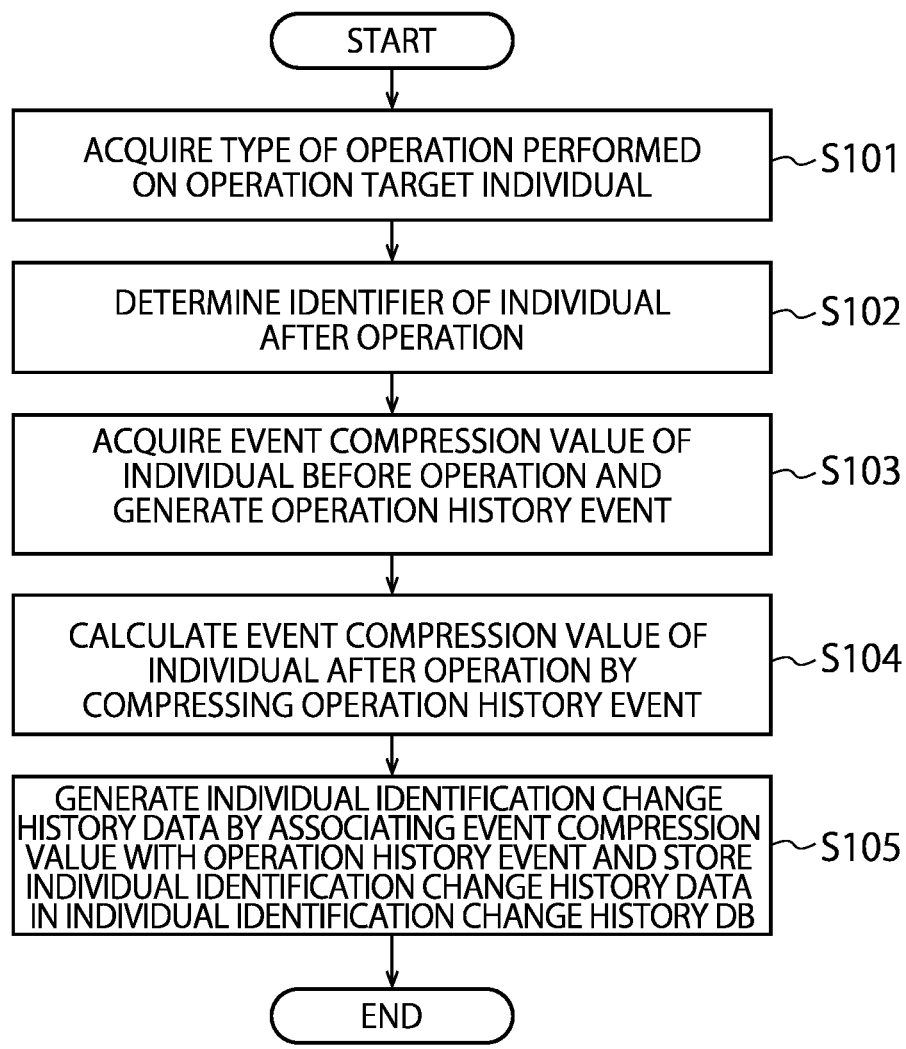
FIG. 20 is a flowchart of an exemplary sequence according to the present embodiment.

FIG. 20 is a flowchart of an exemplary sequence according to the present embodiment. The operation acquirer 105 acquires the type of an operation performed on an operation target individual (individual before the operation) (S101). The operation acquirer 105 acquires an identifier related to the individual before the operation from the reception information DB 104. Alternatively, the identifier may be acquired based on an input from the user. The identifier related to the individual before the operation includes, for example, at least one of the management ID, the belonging ID, the individual class ID, and the individual manufacturing ID.

The operation acquirer 105 requests the individual information manager 109 to determine the identifier (such as the management ID) of the individual after the operation (S102). The individual information manager 109 determines the identifier (such as the management ID) of the individual after the operation (S102). The identifier of the individual after the operation includes, for example, at least one of the management ID, the belonging ID, the individual class ID, and the individual manufacturing ID.

The operation acquirer 105 transfers the time of the operation, the acquired type of the operation, the identifier (such as the management ID) of the individual before the operation, and the identifier of the individual after the operation to the operation history event generator 106.

The operation history event generator 106 acquires, from the reception information DB 104, the event compression value (the event compression value of the individual before the operation) corresponding to the pre-operation management ID received from the operation acquirer 105 (S103). The operation history event including the time of the operation (Item 1), the acquired type of the operation (Item 2), a pair of the identifier of the individual before the operation and the event compression value (Item 3), and the identifier of the individual after the operation (Item 4) is generated. When there are a plurality of operation target individuals and Items 1, 2, and 4 are same, Item 3 includes a plurality of pairs of values corresponding to the plurality of individuals.

The information compressor 107 calculates the event compression value (the event compression value of the individual after the operation) by compressing data of the operation history event generated by the operation history event generator 106 (S104). For example, the hash function is calculated by using, as an input, data in which the strings of the items of the operation history event are connected. An output value from the hash function is the event compression value. At the compression, some items of the operation history event may be excluded. For example, when the individual manufacturing ID is included in Item 4 or Item 3, the individual manufacturing ID may be excluded. Alternatively, the entire Item 4 may be excluded.

The operation history event generator 106 associates the event compression value with the operation history event to generate the individual identification change history data (S105). The individual identification change history data is stored in the individual identification change history DB 108 (S105).

(Modification 1)

A flag (disclosure flag) that indicates permission or non-permission of disclosure of the operation history event is introduced in the above-described embodiment. The individual information manager 109 determines permission or non-permission of disclosure of the operation history event and sets, to the individual identification change history data, the disclosure flag that indicates permission or prohibition of disclosure. For example, permission or prohibition of disclosure is determined in accordance with a transaction counterpart, and the disclosure flag is set.

FIG. 21 is a diagram illustrating other exemplary individual identification change history data. Items 1 to 5 are same as those in FIG. 11. Item 6 indicates the disclosure flag.

When an information acquisition request is received from the lower-level process while the disclosure flag indicates permission, the individual information manager 109 generates the analysis data based on the individual identification change history data and transmits the generated analysis data to the information management device of the lower-level process. When the disclosure flag indicates prohibition, the individual information manager 109 does not transmit the analysis data to the information management device of the lower-level process.

For example, when a plurality of processes exist in parallel at the lower level of the own-process, it is possible to change whether to permit disclosure in accordance with a transaction counterpart. For example, it is possible to disclose the operation history to a business entity of a process but not to disclose the operation history to a business entity of another process.

When the disclosure flag indicates prohibition, the individual information manager 109 may transmit, to a transmission source of the information acquisition request, a message notifying that disclosure of the operation history is prohibited.

The information acquisition request may be transmitted to the higher-level process of the own-process even when the disclosure flag indicates prohibition. In this case, the analysis data received from the information management device of the higher-level process is forwarded to the information management device of the lower-level process. Alternatively, when the disclosure flag indicates prohibition, it may be prohibited to transmit the information acquisition request to the higher-level process.

The individual information manager 109 may include the disclosure flag in the tag information written on a medium. Having read the tag information, the information management device of the higher-level process may not transmit the information acquisition request when the disclosure flag indicates prohibition.

According to the present modification, since the disclosure flag is set for the operation history event, it is possible to prevent the operation history from being disclosed to those other than a permitted target.

(Modification 2)

In the above-described embodiment, an object such as a commercial product, which is a managed side, is a subject, and an operation performed on an individual as the subject is expressed through the type of the operation. However, an object such as a delivery slip or a shelf, which is a managing side, may be a subject, and an operation performed on an individual as the subject may be expressed through the type of the operation. In this case as well, effects similar to those of the above-described embodiment can be basically achieved.

For example, in Specific Example 1 described above, assume that a shipment slip in Process 1 is an operation target individual. The management ID of the individual before the operation is M485 (the management ID of the shipment slip before the eight lettuces are united for shipment), and the management ID of the individual after the operation is M792 (the management ID of the shipment slip after the eight lettuces are united for shipment). Thus, it can be understood that the shipment slip are not associated with the eight lettuces before the operation, but through the operation, the eight lettuces are placed under management by the shipment slip. Accordingly, the order of the management ID is opposite that in Specific Example 1. The type of the operation can be written as unite3 (divide1). The eight lettuces divided through Divide Operation (1) in advance are united through the unite operation 3 of unite3 (divide1). Similarly for the other specific examples, a side that manages an object may be a subject, and a history of operations on an individual as the subject may be recorded. The management ID included in the tag information is the post-operation management ID in the above-described embodiment, but the pre-operation management ID (Item 3) may be used in the present modification.

(Modification 3)

In the above-described embodiment, the event compression value is generated by using the hash function or the like, but the event compression value may be a string obtained by simply connecting the items included in the operation history event. In this case as well, it is possible to easily manage information of an individual, the unit of management of which changes, by managing the operation history event or the individual identification change history data in a distributed manner among the information management devices of the respective processes.

Exemplary applications of the present embodiment will be described below.

Exemplary Application 1

For example, traceability of a fresh foodstuff is considered. Assume that it is necessary to know a temperature environment of a fresh foodstuff in a circulation process to understand the storage status of the fresh foodstuff. Assume that while in an observation target space of a temperature sensor device, the foodstuff has a temperature set in the space. For example, the foodstuff is in an environment at a temperature set by a refrigerator during transport in a refrigerator car, or is in an environment at a temperature in a backyard during storage in the backyard. Specifically, a space to which the foodstuff belongs can be specified by using the type of an operation (for example, Unite Operation (4)) to put the foodstuff to a refrigerator provided with a sensor. It can be determined that the temperature of this foodstuff X while the foodstuff belongs to the refrigerator is a set temperature of the refrigerator. This can be achieved by producing the analysis data (such as the chain graph) described above and understanding the transaction information of an individual in each process through the management ID.

Exemplary Application 2

A shop solution that achieves an unmanned shop and shopping time reduction by using data collected from sales floors is considered. Assumed applications are automatic settlement and promotion effect automatic analysis, and main collected data is the purchase behavior of a customer. A target individual is, for example, a customer, an employee, a commercial product, a promotion object, a sales floor, a fixture, or a facility.

An individual on a sales floor, and an operation on the individual are detected by various sensors, and the individual manufacturing ID and the like of the individual and the type of the detected operation are recorded. It is possible to specify a commercial product (individual) as an appendage of a basket (individual) at an optional timing by tracing operations like the above-described chain graph. Accordingly, a settlement target individual can be specified. Specification of a commercial product in the basket can be performed by specifying a commercial product as an appendage of the basket at an optional timing.

Specifically, a history of an operation (Unite Operation (4)) to append an individual (commercial product) to another individual (basket), and a history of an operation (Divide Operation (4)) to separate the commercial product from the basket are acquired in a duration (from an optional timing to another optional timing). Unite Operation (4) corresponds to an operation to put a commercial product into the basket, and Divide Operation (4) corresponds to an operation to return a commercial product in the basket to a shelf. Any commercial product put in the basket through Unite Operation (4) and not returned to a shelf through Divide Operation (4) can be specified as a commercial product in the basket.

(Hardware Configuration)

Figure 22:
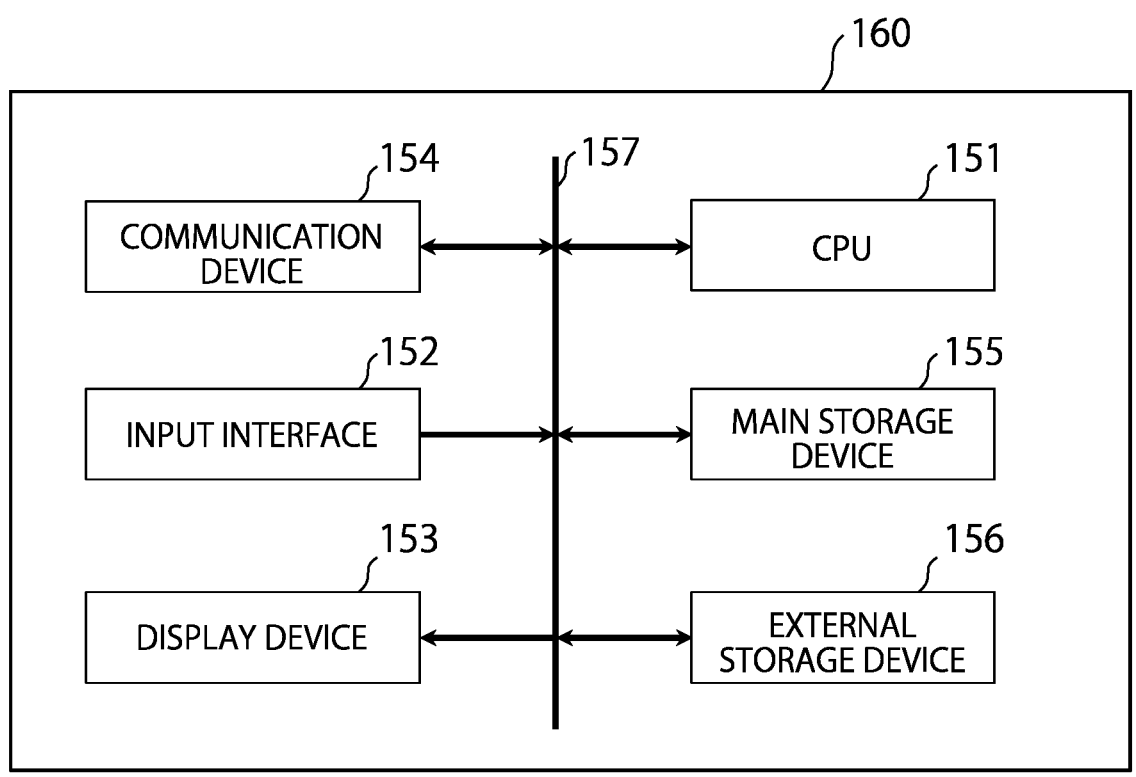
FIG. 22 is a diagram illustrating a hardware configuration of an information processing device according to the present embodiment.

FIG. 22 illustrates a hardware configuration of the information management device (information processing device) 100 according to the present embodiment. The information processing device 100 according to the present embodiment is constructed of a computer device 160. The computer device 160 is provided with a CPU 151, an input interface 152, a display device 153, a communication device 154, a main storage 155 and an external storage device 156, which are mutually connected by a bus 157.

The CPU (central processing unit) 151 executes a computer program for implementing the above-mentioned respective functional components of the information processing device 100 on the main storage 155. The CPU 151 executes the computer program and thereby implements the respective functional components.

The input interface 152 is a circuit for inputting operation signals from the input device such as a keyboard, mouse, and touch panel or the like into the information processing device 100. The inputter (input device) 113 that carries out the input function can be constructed on the input interface 154.

The display device 153 displays data or information outputted from the information processing device 100. The display device 153 is, for example, an LCD (Liquid Crystal Display), a CRT (Cathode Ray Tube), and a PDP (plasma display), but the display device 153 is not limited thereto. The data or information outputted from computer device 160 can be displayed by this display device 153. The outputter (output device) 114 can be constructed on the display device 153.

The communication device 154 is a circuit for the information processing device 100 to communicate with the external device by wireless or wired means. Information can be inputted from the external device via the communication device 154. The information inputted from the external device can be stored in the DB. The communication function of the information management device 100 can be constructed on the communication device 154.

The main storage 155 stores a program that implements processing of the present embodiment, data necessary to execute the program and data generated by executing the program. The program is developed and executed on the main storage 155. The main storage 155 may be, for example, RAM, DRAM or SRAM, but it is not limited to this. The various DBs and the storage in each embodiment may be constructed on the main storage 155.

The external storage device 156 stores the above-described program and data necessary to execute the program, data generated by executing the program or the like. The program and data are read into the main storage 155 during processing of the present embodiment. The external storage device 156 is, for example, a hard disk, an optical disk, a flash memory or a magnetic tape, but it is not limited to this. The various DBs and the storage in each embodiment may be constructed on the external storage device 156.

Note that the above-described program may be pre-installed in the computer device 160 or may be stored in a storage medium such as a CD-ROM. The program may be uploaded on the Internet.

Note that the computer device 160 may be provided with one or a plurality of processors 151, input interfaces 152, display devices 153, communication devices 154 and main storages 155, and peripheral devices such as a printer and a scanner may be connected thereto.

In addition, the information processing device 100 may be constructed of the single computer device 160 or may be configured as a system composed of a plurality of mutually connected computer devices 160.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing device arranged corresponding to a first process downstream from a second process, the first process performing a first operation on a first individual that has been obtained by performing a second operation on a third individual in the second process and allocated a first identifier in the second process, to obtain a second individual, comprising:
    an information reader circuit configured to read the first identifier from a second storage medium associated with the first individual;
    processing circuitry configured to detect, via a user input or a detector, the first operation performed in the first process,
    allocate a second identifier to the second individual obtained in the first operation, and
    generate first data including the first identifier read by the information reader circuit, the first operation detected, and the second identifier allocated to the second individual and store the first data in a database; and
    an information writer circuit configured to write the second identifier to a first storage medium associated with the second individual, wherein the first operation and the second operation are operations that change a unit of management of an individual.

2. The management information processing device according to claim 1, wherein the processing circuitry calculates a first value based on the first data, wherein the first value is associated with the first data in the database.

3. The information processing device according to claim 2, wherein the information writer circuit writes first notification information including the first value and the second identifier to the first storage medium associated with the second individual.

4. The information processing device according to claim 3, wherein the processing circuitry is configured to transmit the first data to a first information processing device arranged corresponding to the third process when the processing circuitry receives a first information acquisition request including the first value from the first information processing device.

5. The information processing device according to claim 4, wherein
    the processing circuitry sets a flag including permission or non-permission of disclosure in association with the first data in the database, and
    the processing circuitry transmits the first data when the flag indicates permission.

6. The information processing device according to claim 5, wherein
    the processing circuitry does not transmit the first data when the flag indicates non-permission.

7. The information processing device according to claim 1, wherein the information reader circuit reads, from the second storage medium associated with the first individual, second notification information including a second value and the first identifier, the second value being based on second data, and
    the processing circuitry generates third data, the third data including the second value, the first identifier, the first operation, and the second identifier.

8. The information processing device according to claim 7, wherein
    the second data includes a third identifier of the third individual, the second operation, and the first identifier.

9. The information processing device according to claim 7, wherein the processing circuitry calculates a third value based on the third data, wherein the third value is associated with the third data.

10. The information processing device according to claim 9, wherein the information writer circuit writes third notification information including the third value and the second identifier to a first storage medium for the second individual.

11. The information processing device according to claim 9, wherein the processing circuitry transmits a second information acquisition request including the second value to a second information processing device arranged corresponding to the second process and receive the second data from the second information processing device.

12. The information processing device according to claim 11, wherein
    the processing circuitry receives, from a first information processing device arranged corresponding to the third process, a third information acquisition request including the third value,
    when the third information acquisition request is received, the processing circuitry transmits the second information acquisition request to the second information processing device, and
    the processing circuitry transmits the second data and the first data to the first information processing device.

13. The information processing device according to claim 12, wherein
    a flag including permission or non-permission of disclosure is associated with the second data, and
    the processing circuitry transmits the third information acquisition request to the second information processing device when the flag indicates permission.

14. The information processing device according to claim 13, wherein
    the processing circuitry does not transmit the third information acquisition request to the second information processing device when the flag indicates non-permission.

15. The information processing device according to claim 11, wherein the processing circuitry specifies a history of operations performed on the second individual based on the first data and the second data.

16. The information processing device according to claim 15, wherein the processing circuitry determines whether the history of operations on the second individual has inconsistency based on an order of the operation in the second data and the operation in the first data.

17. The information processing device according to claim 15, wherein the processing circuitry determines whether the history of operation on the second individual has inconsistency in accordance with whether the first identifier in the second data matches the first identifier in the first data.

18. The information processing device according to claim 1, wherein the second identifier includes an identifier that identifies a unit of management of the second individual.

19. The information processing device according to claim 18, wherein the second identifier further includes at least one of an identifier that identifies the type of the second individual, an identifier that uniquely identifies the second individual, and an identifier of a management system configured to perform management of the second individual.

20. The information processing device according to claim 1, wherein the processing circuitry generates, as the first data, data including the first identifier, a type of the first operation, and the second identifier.

21. The information processing device according to claim 20, wherein the processing circuitry acquires the type of the first operation performed on the first individual.

22. The information processing device according to claim 20, wherein the first operation and the second operation each includes at least one of a create operation to create an individual, a unite operation to unite a plurality of individuals, a divide operation to divide an individual, a convert operation to convert an individual, and a delete operation to delete an individual.

23. An information processing method in an information processing device arranged corresponding to a first process downstream from a second process, the first process performing a first operation on a first individual that has been obtained by performing a second operation on a third individual in the second process and allocated a first identifier in the second process, comprising:

reading the first identifier from a second storage medium associated with the first individual;

detecting, via a user input or a detector, the first operation performed in the first process;

allocating a second identifier to the second individual obtained in the first operation;

generating first data including the first identifier read, the first operation detected, and the second identifier allocated to the second individual and store the first data in a database; and writing the second identifier to a first storage medium associated with the second individual, wherein the first operation and the second operation are operations that change a unit of management of an individual.

24. A non-transitory computer recordable medium having a computer program stored therein which causes a computer to perform processes, the computer being arranged corresponding to a first process downstream from a second process, the first process performing a first operation on a first individual that has been obtained by performing a second operation on a third individual in the second process and allocated a first identifier in the second process, the processes comprising:

reading the first identifier from a second storage medium associated with the first individual;

detecting, via a user input or a detector, the first operation performed in the first process;

allocating a second identifier to the second individual obtained in the first operation;

generating first data including the first identifier read, the first operation detected, and the second identifier allocated to the second individual and store the first data in a database; and writing the second identifier to a first storage medium associated with the second individual, wherein the first operation and the second operation are operations that change a unit of management of an individual.

* * * * *